United States Patent
Fang et al.

(10) Patent No.: US 11,144,477 B2
(45) Date of Patent: Oct. 12, 2021

(54) METHOD FOR PROCESSING RECLAIMABLE MEMORY PAGES, ELECTRONIC DEVICE, AND COMPUTER-READABLE STORAGE MEDIUM

(71) Applicant: GUANGOONG OPPO MOBILE TELECOMMUNICATIONS CORP., LTD., Guangdong (CN)

(72) Inventors: Pan Fang, Dongguan (CN); Yan Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 323 days.

(21) Appl. No.: 16/168,236

(22) Filed: Oct. 23, 2018

(65) Prior Publication Data
US 2019/0205266 A1    Jul. 4, 2019

(30) Foreign Application Priority Data
Dec. 29, 2017  (CN) .......................... 201711480487.8

(51) Int. Cl.
*G06F 12/00*     (2006.01)
*G06F 12/123*    (2016.01)
(Continued)

(52) U.S. Cl.
CPC .......... *G06F 12/124* (2013.01); *G06F 9/5022* (2013.01); *G06F 11/3419* (2013.01);
(Continued)

(58) Field of Classification Search
CPC .. G06F 12/124; G06F 9/5022; G06F 12/0253; G06F 12/123
See application file for complete search history.

(56) References Cited

U.S. PATENT DOCUMENTS 5,592,432 A    1/1997  Vishlitzky
5,787,473 A    7/1998  Vishlitzky
(Continued)

FOREIGN PATENT DOCUMENTS

CN    101673216 A    3/2010
CN    103186436 A    7/2013
(Continued)

OTHER PUBLICATIONS

Chien-Chung Ho et al: "Efficient hibernation resuming with classification-based prefetching scheme for embedded computing systems", ACM SIGAPP Applied Computing Review, ACM, 2 Penn Plaza, Suite 701 New York NY 10121-0701 USA, vol. 15, No. 1, Mar. 27, 2016 (Mar. 27, 2016), pp. 33-43, XP058067404, ISSN: 1559-6915, DOI: 10.1145/2753060.2753064 * abstract * * p. 36, left-hand column, line 1—p. 38, left-hand column, line 8 * * figures 1, 4-6*.
(Continued)

*Primary Examiner* — Reginald G Bragdon
*Assistant Examiner* — Michael L Westbrook
(74) *Attorney, Agent, or Firm* — Ladas & Parry LLP

(57) ABSTRACT

The disclosure relates to a method for processing an application, an electronic device, and a computer-readable storage medium. The method is carried in an electronic device and includes that a plurality of reclaimable memory pages occupied by an application to be processed are determined; data stored in the plurality of reclaimable memory pages is written into an external storage medium; an operation of the application to be processed is paused; and the data written into the external storage medium is written into a memory when the operation of the application to be processed is unpaused.

18 Claims, 13 Drawing Sheets

(51) Int. Cl.
  *G06F 12/02* (2006.01)
  *G06F 11/34* (2006.01)
  *G06F 9/50* (2006.01)
  *G06F 12/08* (2016.01)

(52) U.S. Cl.
  CPC .......... *G06F 12/0253* (2013.01); *G06F 12/08* (2013.01); *G06F 12/123* (2013.01); *G06F 2212/1024* (2013.01); *G06F 2212/1044* (2013.01); *G06F 2212/502* (2013.01)

(56) References Cited

U.S. PATENT DOCUMENTS

| | | | |
|---|---|---|---|
| 7,827,358 | B2 | 11/2010 | Watson |
| 8,516,198 | B2 | 8/2013 | Watson |
| 9,535,771 | B2 | 1/2017 | Watson et al. |
| 9,747,222 | B1 | 8/2017 | Armangau et al. |
| 10,127,090 | B2 | 11/2018 | Watson et al. |
| 2008/0168235 | A1 | 7/2008 | Watson |
| 2011/0035554 | A1 | 2/2011 | Watson |
| 2011/0060887 | A1 | 3/2011 | Thatcher |
| 2014/0059571 | A1 | 2/2014 | Watson et al. |
| 2014/0359111 | A1* | 12/2014 | Hilmo ............... H04L 43/04 709/224 |
| 2015/0293782 | A1 | 10/2015 | Shida |
| 2015/0347181 | A1* | 12/2015 | Myrick ............... G06F 12/02 718/102 |
| 2017/0075739 | A1 | 3/2017 | Watson et al. |
| 2018/0024750 | A1* | 1/2018 | Hassan ............... G06F 3/064 711/105 |
| 2018/0307600 | A1 | 10/2018 | Wang et al. |

FOREIGN PATENT DOCUMENTS

| | | |
|---|---|---|
| CN | 104699626 A | 6/2015 |
| CN | 105404551 A | 3/2016 |
| CN | 105988827 A | 10/2016 |
| CN | 106484472 A | 3/2017 |
| CN | 107463403 A | 12/2017 |
| CN | 107491353 A | 12/2017 |
| EP | 0919927 A2 | 6/1999 |
| EP | 3388946 A1 | 10/2018 |
| WO | 2017114288 A1 | 7/2017 |
| WO | 2017206403 A1 | 12/2017 |

OTHER PUBLICATIONS

Ahmed Hussein et al: "One Process to Reap Them All", Virtual Execution Environments, ACM, 2 Penn Plaza, Suite 701 New York NY 10121-0701 USA, Apr. 8, 2017 (Apr. 8, 2017) pp. 171-186, XP058327086, DOI: 10.1145/3050748.3050754 ISBN: 978-1-4503-4948-2 * abstract * * p. 176, left-hand column, line 1 *.

Xiaoning Ding et al: "A buffer cache management scheme exploiting both temporal and spatial localities", ACM Transactions on Storage, Association for Computing Machinery, New York, NY, US, vol. 3 No. 2, Jun. 1, 2007 (Jun. 1, 2007), pp. 5-es, XP058106799, ISSN: 1553-3077, DOI:10.1145/1242520.1242522 * abstract * * p. 8, line 4-line 29 *.

Vivek Narasayya et al: "Sharing buffer pool memory in multi-tenant relational database-as-a-service", Proceedings of the VLDB Endowment; [ACM Digital Library], Assoc. of Computing Machinery, New York, NY, vol. 8, No. 7 , Feb. 1, 2016 (Feb. 1, 2016), pp. 726-737, XP058067355, ISSN: 2150-8097, DOI: 10.14778/2752939. 2752942 * abstract * *p. 731, left-hand column, line 3—p. 732, right-hand column, line 26 *.

Kan Zhong et al: "Building NVRAM-Aware Swapping Through Code Migration in Mobile Devices", IEEE Transactions on Parallel and Distributed Systems, vol. 28, No. 11, Nov. 1, 2017 (Nov. 1, 2017), pp. 3089-3099, XP055522583, US ISSN: 1045-9219, DOI: 10.1109/TPDS, 2017.2713780 * abstract * *p. 3092, left-hand column, line 39—p. 3093, left hand column, line 34*.

Supplementary European Search Report in the European application No. 18204914.8, dated Apr. 26, 2019.

International Search Report in international application No. PCT/CN2018/115480, dated Jan. 21, 2019.

Written Opinion of the International Search Authority in international application No. PCT/CN2018/115480, dated Jan. 21, 2019.

Lingli Dai et al. "Exchange mechanism", Linux kernel analysis and example application, Dec. 31, 2002, p. 92-96.

Office Action of the Indian application No. 201814048951, dated Oct. 9, 2020.

First Office Action of the Chinese application No. 201711480487.8, dated Nov. 2, 2020.

First Office Action of the European application No. 18204914.8, dated Feb. 24. 2021.

Second Office Action of the Chinese application No. 201711480487. 8, dated Mar. 15, 2021.

Rejection Decision of the Chinese application No. 201711480487.8, dated Jul. 5, 2021.

"Principles and Structures of Linux", guo Yudong et al., pp. 92-96, xidian University Press, Feb. 29, 2012.

* cited by examiner

METHOD FOR PROCESSING RECLAIMABLE MEMORY PAGES, ELECTRONIC DEVICE, AND COMPUTER-READABLE STORAGE MEDIUM

This application is filed based upon and claims priority to Chinese Patent Application No. 201711480487.8, filed on Dec. 29, 2017, the entire contents of which are incorporated herein by reference.

BACKGROUND

When an application installed on an electronic device operates, a certain memory needs to be occupied. The memory is a main storage medium for data of an application during operation. Since the memory capacity of the electronic device is limited, when the memory occupied by background applications is excessive, the operation efficiency of a foreground application may be affected. Therefore, it is necessary to reclaim the memory, so as to improve the operation efficiency of the foreground application.

The related method for processing an application is to kill an application operating in a background, so as to reclaim all memory occupied by the application and to provide the reclaimed memory to a foreground application for use. However, after a background application is killed, it is necessary to re-generate new application data when a user re-starts the application, so that an operation speed of the application of which a memory has been reclaimed is significantly reduced.

SUMMARY

The embodiments of the disclosure provide a method for processing an application, an electronic device, and a computer-readable storage medium.

In a first aspect, a method for processing an application is provided. The method is carried in an electronic device and includes that a plurality of reclaimable memory pages occupied by an application to be processed are determined; data stored in the plurality of reclaimable memory pages is written into an external storage medium; an operation of the application to be processed is paused; and the data written into the external storage medium is written into a memory when the operation of the application to be processed is unpaused.

In a second aspect, an electronic device is provided. The electronic device includes a processor and a memory storing a computer program that when executed by the processor to enable the processor to determine a plurality of recoverable memory pages occupied by an application to be processed; write data stored in the plurality of reclaimable memory pages into an external storage medium; pause an operation of the application to be processed; and write the data written into the external storage medium into a memory when the operation of the application to be processed is unpaused.

In a third aspect, a computer-readable storage medium is provided. The computer-readable storage medium has stored thereon a computer program that when executed by a processor to implement a method for processing an application, the method is carried out in an electronic device and include that a plurality of reclaimable memory pages occupied by an application to be processed are determined; data stored in the plurality of reclaimable memory pages is written into an external storage medium; an operation of the application to be processed is paused; and the data written into the external storage medium is written into a memory when the operation of the application to be processed is unpaused.

BRIEF DESCRIPTION OF DRAWINGS

In order to describe the technical solutions in the embodiments of the disclosure or the related art more clearly, the drawings required to be used in descriptions of the embodiments or the related art will be simply introduced below. It is apparent that the drawings in the following descriptions are only some embodiments of the disclosure. Those of ordinary skilled in the art may further obtain other drawings according to these drawings without creative work.

DETAILED DESCRIPTION

Figure 1:
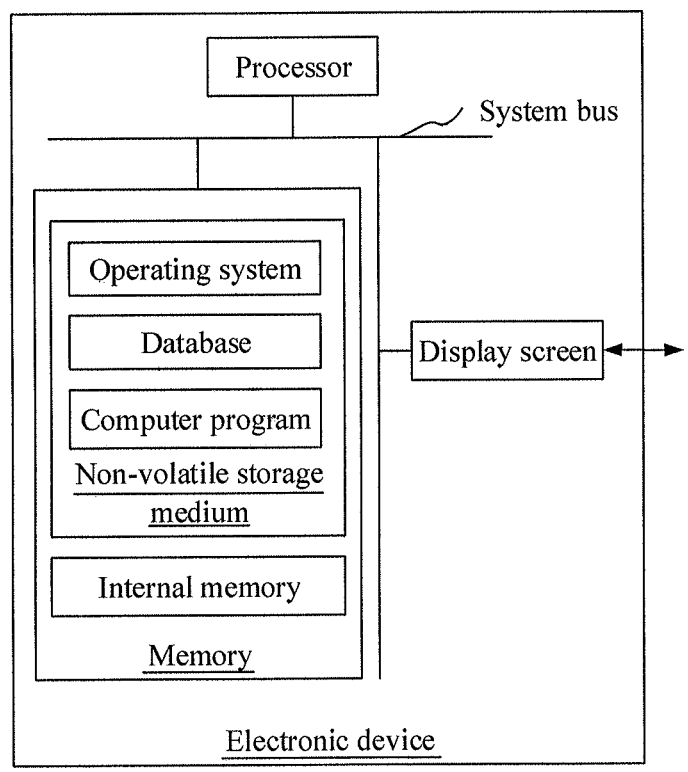
FIG. 1 is a schematic diagram of an internal structure of an electronic device in an embodiment.

In order to make the objectives, technical solutions and advantages of the disclosure clearer, the disclosure will be further elaborated below in conjunction with the drawings and the embodiments. It will be appreciated that specific embodiments described here are only used to explain the disclosure, but not to limit the disclosure.

At least some embodiments of the disclosure provide the following solutions.

Solution 1. A method for processing an application, the method being carried out in an electronic device and comprising:

determining a plurality of recoverable memory pages occupied by an application to be processed;

writing data stored in the plurality of reclaimable memory pages into an external storage medium;

pausing an operation of the application to be processed; and writing the data written into the external storage medium into a memory when the operation of the application to be processed is unpaused.

Solution 2. The method of solution 1, wherein writing the data stored in the plurality of reclaimable memory pages into the external storage medium comprises:

writing the data stored in the plurality of reclaimable memory pages into the external storage medium in an asynchronous transmission manner, and wherein writing the data written into the external storage medium into the memory comprises:

writing the data written into the external storage medium into the memory in a synchronous transmission manner.

Solution 3. The method of solution 1, further comprising: after pausing the operation of the application to be processed, determining an increment of the memory occupied by the application to be processed; and when the increment is greater than a preset increase threshold, determining the plurality of recoverable memory pages occupied by the application to be processed;

writing the data stored in the plurality of reclaimable memory pages into the external storage medium; and pausing the operation of the application to be processed.

Solution 4. The method of solution 1, wherein determining the plurality of reclaimable memory pages occupied by the application to be processed comprises:

traversing memory-mapped files of the application to be processed;

querying, through the memory-mapped files, all memory pages occupied by the application to be processed; and determining as the plurality of reclaimable memory pages the all memory pages except at least one particular memory page, wherein data stored on each of the at least one particular memory page is being used by the application to be processed or is data necessary for keeping normal running of the application to be processed.

Solution 5. The method of solution 4, wherein the determining as the plurality of reclaimable memory pages the all memory pages except at least one particular memory page comprises:

determining at least one particular memory page having stored data being used by the application to be processed or having data necessary for keeping normal running of the application to be processed;

configuring an occupation mark for each of the at least one particular memory page, the occupation mark indicating that the particular memory page cannot be reclaimable; and determining as the plurality of reclaimable memory pages the all memory pages except at least one particular memory page for which the occupation mark is configured.

Solution 6. The method of solution 1, wherein writing the data stored in the plurality of reclaimable memory pages into the external storage medium comprises:

determining an idle duration of the application to be processed for each reclaimable memory page, the idle duration is a duration during which the reclaimable memory page is not used by the application to be processed;

determining a duration threshold according to idle durations for the plurality of reclaimable memory pages; and selecting a reclaimable memory page for which the idle duration is greater than the duration threshold from the plurality of reclaimable memory pages, and writing data stored in the selected reclaimable memory page into the external storage medium.

Solution 7. The method of solution 6, wherein determining the idle duration of the application to be processed for each reclaimable memory page comprises:

determining update time recorded by a timestamp of each reclaimable memory page, and calculating the idle duration corresponding to the reclaimable memory page according to the update time; or determining update time of each reclaimable memory page recorded by a Least Recently Used (LRU) management unit, and calculating the idle duration corresponding to the reclaimable memory page according to the update time;

wherein the update time is a time at which the reclaimable memory page is used recently by the application to be processed.

Solution 8. The method of solution 6, wherein determining the duration threshold according to the idle duration for the plurality of reclaimable memory pages comprises:

calculating an average idle duration of the application to be processed for the plurality of reclaimable memory pages according to the idle duration for each reclaimable memory page, and taking the average idle duration as the duration threshold; or determining a number of reclaiming for the plurality of reclaimable memory pages, selecting a Kth-largest idle duration from the idle durations for the plurality of reclaimable memory pages according to the number of the reclaiming, and taking the selected idle duration as the duration threshold, a number of reclaimable memory pages for which the idle durations are greater than the Kth-largest idle duration being the number of the reclaiming, and K being a natural number greater than the number of the reclaiming.

Solution 9. The method of solution 1, further comprising: before determining the plurality of reclaimable memory pages occupied by the application to be processed, detecting whether at least one foreground application is dependent on the application to be processed;

when the at least one foreground application is dependent on the application to be processed, adjusting a priority of the application to be processed to match a priority of the at least one foreground application; and when the at least one foreground application is not dependent on the application to be processed, determining the plurality of reclaimable memory pages occupied by the application to be processed.

Solution 10. An electronic device, comprising a processor and a memory storing a computer program that when executed by the processor to enable the processor to:

determine a plurality of recoverable memory pages occupied by an application to be processed;

write data stored in the plurality of reclaimable memory pages into an external storage medium;

pause an operation of the application to be processed; and write the data written into the external storage medium into a memory when the operation of the application to be processed is unpaused.

Solution 11. The electronic device of solution 10, wherein the processor is configured to:

write the data stored in the plurality of reclaimable memory pages into the external storage medium in an asynchronous transmission manner; and write the data written into the external storage medium into the memory in a synchronous transmission manner.

Solution 12. The electronic device of solution 10, wherein the processor is configured to, after the operation of the application to be processed is paused, determine an increment of the memory occupied by the application to be processed; and when the increment is greater than a preset increase threshold, determine the plurality of recoverable memory pages occupied by the application to be processed;

write the data stored in the plurality of reclaimable memory pages into the external storage medium; and pause the operation of the application to be processed.

Solution 13. The electronic device of solution 10, wherein the processor is configured to:

traverse memory-mapped files of the application to be processed;

query, through the memory-mapped files, all memory pages occupied by the application to be processed; and determine as the plurality of reclaimable memory pages the all memory pages except at least one particular memory page, wherein data stored on each of the at least one particular memory page is being used by the application to be processed or is data necessary for keeping normal running of the application to be processed.

Solution 14. The electronic device of solution 13, wherein the processor is configured to:

determine at least one particular memory page having stored data being used by the application to be processed or having data necessary for keeping normal running of the application to be processed;

configure an occupation mark for each of the at least one particular memory page, the occupation mark indicating that the particular memory page cannot be reclaimable; and determine as the plurality of reclaimable memory pages the all memory pages except at least one particular memory page for which the occupation mark is configured.

Solution 15. The electronic device of solution 10, wherein the processor is configured to:

determine an idle duration of the application to be processed for each reclaimable memory page, the idle duration is a duration during which the reclaimable memory page is not used by the application to be processed;

determine a duration threshold according to idle durations for the plurality of reclaimable memory pages; and select a reclaimable memory page for which the idle duration is greater than the duration threshold from the plurality of reclaimable memory pages, and write data stored in the selected reclaimable memory page into the external storage medium.

Solution 16. The electronic device of solution 15, wherein the processor is configured to:

determine update time recorded by a timestamp of each reclaimable memory page, and calculate the idle duration corresponding to the reclaimable memory page according to the update time; or determine update time of each reclaimable memory page recorded by a Least Recently Used (LRU) management unit, and calculate the idle duration corresponding to the reclaimable memory page according to the update time;

wherein the update time is a time at which the reclaimable memory page is used recently by the application to be processed.

Solution 17. The electronic device of solution 15, wherein the processor is configured to:

calculate an average idle duration of the application to be processed for the plurality of reclaimable memory pages according to the idle duration for each reclaimable memory page, and take the average idle duration as the duration threshold; or determine a number of reclaiming for the plurality of reclaimable memory pages, select a Kth-largest idle duration from the idle durations for the plurality of reclaimable memory pages according to the number of the reclaiming, and take the selected idle duration as the duration threshold, wherein a number of reclaimable memory pages for which the idle durations are greater than the Kth-largest idle duration is the number of the reclaiming, and K is a natural number greater than the number of the reclaiming.

Solution 18. The electronic device of solution 10, the processor is configured to, before the plurality of reclaimable memory pages occupied by the application to be processed is are determined, detect whether at least one foreground application is dependent on the application to be processed;

when the at least one foreground application is dependent on the application to be processed, adjust a priority of the application to be processed to match a priority of the at least one foreground application; and when the at least one foreground application is not dependent on the application to be processed, determine the plurality of reclaimable memory pages occupied by the application to be processed.

Solution 19. A computer-readable storage medium having stored thereon a computer program that when executed by a processor to implement the method for processing the application according to solutions 1 to 9.

Solution 20. A device for processing an application includes that a memory page determination module, configured to determine a plurality of reclaimable memory pages occupied by an application to be processed; a stored data processing module, configured to write data stored in the plurality of reclaimable memory pages into an external storage medium; and an application processing module, configured to pause an operation of the application to be processed, wherein the stored data processing module is further configured to write the data written into the external storage medium into a memory when the operation of the application to be processed is unpaused.

According to the method and device for processing the application, the electronic device and the computer-readable storage medium provided in the embodiments of the disclosure, data stored in reclaimable memory pages occupied by an application to be processed is saved, and an operation of the application to be processed is paused instead of direct quitting of the application to be processed; and when the application to be processed resumes the operation, the saved data is re-written into a memory. In such manner, operational data when the application to be processed is paused is retained, so that an operation speed of the application to be processed is prevented from being reduced when the application to be processed resumes the operation.

In an embodiment, as illustrated in FIG. 1, a schematic diagram of an internal structure diagram of an electronic device is provided. The electronic device includes a processor, a memory and a display screen, which are connected through a system bus. The processor is configured to provide computing and control capabilities for supporting the operation of the entire electronic device. The memory is configured to store data, programs, and/or instruction codes or the like, the memory stores at least one computer program, and the computer program may be executed by the processor to implement a method for processing an application which is applied to an electric device provided in the embodiments of the disclosure. The memory may include non-volatile storage media such as a magnetic disk, an optical disc and a Read-Only Memory (ROM), or a Random Access Memory (RAM) or the like. For example, in an embodiment, the memory includes a non-volatile storage medium and an internal memory. The non-volatile storage medium stores an operating system, a database and a computer program. The database stores associated data for implementing a method for processing an application provided in various embodiments, the database may store, for example, information such as the name of each application and a memory page allocated for each application. The computer program may be executed by the processor to implement a method for processing an application provided in various embodiments of the disclosure. The internal memory provides a cache operation environment for the operating system, the database and the computer program in the non-volatile storage medium. The display screen may be a touch screen such as a capacitive screen or an electronic screen, which is configured to display interface display information of a foreground application and may also be configured to detect a touch operation acting on the display screen to generate a corresponding instruction such as an instruction for switching foreground and background applications.

A person skilled in the art may understand that the structure illustrated in FIG. 1 is only a block diagram of partial structure associated with the solution of the disclosure, and is not limitative to the electronic device to which the solution of the disclosure is applied. Specifically, the electronic device may include more or fewer components than those illustrated in the figure, or combination of some components, or different arrangements of components. For example, the electronic device further includes a network interface connected through a system bus, and the network interface may be an Ethernet card or a wireless network card for communicating with an external electronic device, and communicating, for example, with a server.

Figure 2:
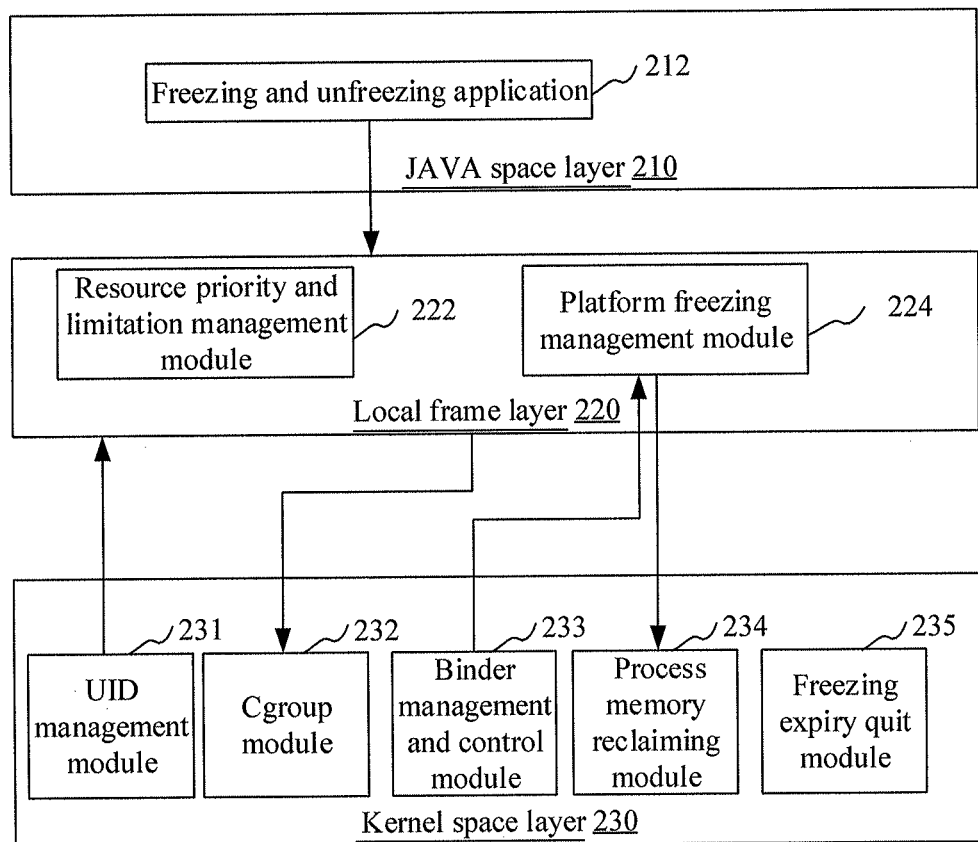
FIG. 2 is a schematic diagram of partial frame of a system in an electronic device in an embodiment.

In an embodiment, as illustrated in FIG. 2, a partial architecture diagram of an electronic device is provided. An architecture system of the electronic device includes a JAVA space layer 210, a local frame layer 220 and a kernel space layer 230. The JAVA space layer 210 may include a freezing and unfreezing application 212, and the electronic device may implement a freezing policy for each application through the freezing and unfreezing application 212 to perform a freezing operation on related applications power-consuming in the background. The local frame layer 220 includes a resource priority and limitation management module 222 and a platform freezing management module 224. The electronic device may maintain different applications in organizations of different priorities and different resources in real time through the resource priority and limitation management module 222, and adjust resource groups of application programs according to demands of an upper layer so as to achieve the effects of optimizing the performance and reducing the power consumption. The electronic device may allocate tasks that can be frozen in the background to different preset corresponding freezing layers according to the duration of entering the freezing through the platform freezing management module 224. Optionally, there may be three freezing layers, namely a CPU restriction sleep mode, a CPU freezing sleep mode, and a process deep freezing mode. The CPU restriction sleep mode refers to that CPU resources occupied by related processes are restricted, so that the related processes occupy fewer CPU resources, idle CPU resources are inclined to other unfrozen processes, occupation of the CPU resources is restricted, and occupation of the processes for network resources and Input/Output (I/O) interface resources are also correspondingly restricted. The CPU freezing sleep mode refers to that related processes are prohibited from using a CPU, but occupation of a memory is retained, and when the CPU resources are prohibited, the corresponding network resources and I/O interface resources are also be prohibited. The process deep freezing mode refers to that memory resources occupied by related processes are further reclaimed in addition to prohibiting the use of CPU resources, and the reclaimed memory may be available for other processes. The kernel space layer 230 includes a User Identifier (UID) management module 231, a Cgroup module 232, a Binder management and control module 233, a process memory reclaiming module 234, and a freezing expiry quit module 235. The UID management module 231 is configured to manage or freeze resources of a third-party application based on a UID of an application. Compared with process management and control based on a Process Identifier (PID), it is more convenient to uniformly manage resources of applications for a user through the UID. The Cgroup module 232 is configured to provide a set of perfect Central Processing Unit (CPU), CPUSET, memory, I/O and Net-related resource limitation mechanism. The Binder management and control module 233 is configured to control a priority of a background binder communication. Here, an interface module of the local frame layer 220 includes a binder interface developed to an upper layer, and a frame or application of the upper layer sends a resource limitation or freezing instruction to the resource priority and limitation management module 222 and the platform freezing management module 224 through the provided binder interface. The process memory reclaiming module 234 is configured to implement the process deep freezing mode, so that when a certain third-party application is in a frozen state for a long time, a file area of a process is mainly released, thereby achieving the effect of saving a memory module and increasing the next starting speed of the application. The freezing expiry quit module 235 is configured to solve an abnormality generated in a freezing expiry scene. Through the above architecture, a method for processing an application in various embodiments of the disclosure may be implemented.

Figure 3:
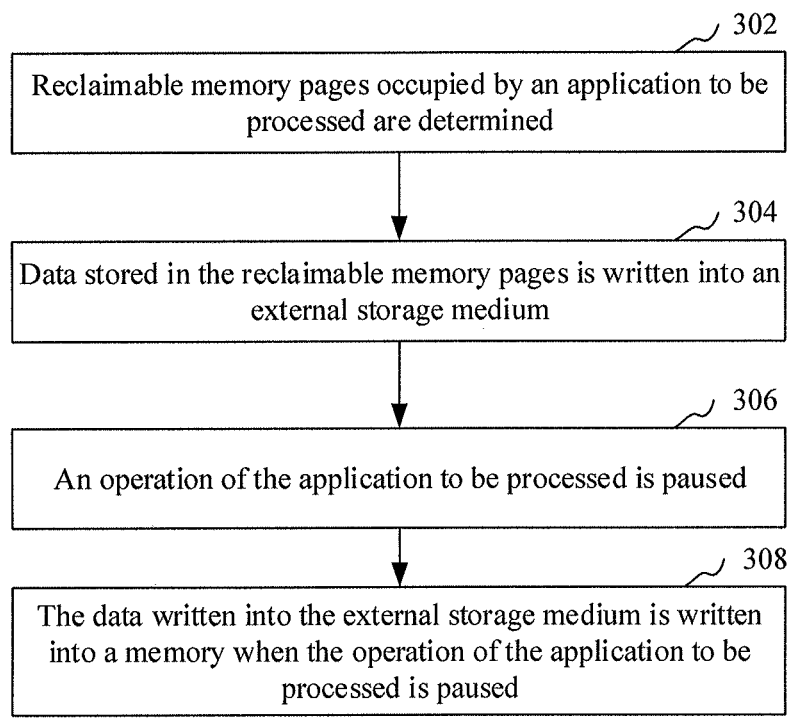
FIG. 3 is a flowchart of a method for processing an application in an embodiment.

In an embodiment, as illustrated in FIG. 3, a method for processing an application is provided. The present embodiment describes an example that the method is applied to the electronic device as illustrated in FIG. 1. The method includes the operations as follows.

In 302, reclaimable memory pages occupied by an application to be processed are determined.

The application to be processed represents an application of which the occupied memory needs to be reclaimed. Usually, the application to be processed is a background application. The background application is an application operating in a background, and correspondingly, an application operating in a foreground is a foreground application. The operation of an application (APP) is usually embodied by the operation of multiple associated processes. The process is an operation activity of a program in a computer on a certain data set, the process is a basic unit of a system for resource allocation and scheduling, and the process is the basis of an operating system structure. A process involved in the operation of the foreground application is a foreground process, and a process involved in the operation of the background application is a background process.

The application in an operating state needs to occupy a memory space to store data during operation. Memory spaces occupied by different applications in different operating states are not necessarily the same. A memory page is a unit in which the operating system manages a memory, and sizes of unit memory occupied by memory pages set by different electronic devices are not necessarily the same. For example, the memory space in the electronic device is divided into 100,000 memory pages, memory pages occupied by the application to be processed are the memory page 100 to the memory page 200, and the memory page 130 to the memory page 200 therein are reclaimable memory pages.

In an embodiment, the electronic device may pre-record all memory pages occupied by the application to be processed during operation, and determines reclaimable memory pages from all the memory pages. The reclaimable memory pages represent memory pages which are reclaimable and which do not affect or slightly affect the operation of the application to be processed or other applications after the reclaimable memory pages are reclaimed.

In an embodiment, the electronic device may record which memory pages are reclaimable memory pages and which memory pages are non-reclaimable memory pages among all the memory pages, and may determine reclaimable memory pages occupied by the application to be processed according to the recorded information.

In 304, data stored in the reclaimable memory pages is written into an external storage medium.

The external storage medium is a peripheral storage medium relative to a memory. The external storage medium may be a non-volatile storage medium such as a hard disk in the electronic device. The electronic device may take parts or all of the determined reclaimable memory pages as memory pages to be reclaimed, and reclaim data stored in the memory pages to be reclaimed, so as to release the memory occupied by the application to be processed.

The electronic device further stores the data stored in the reclaimed memory pages into the external storage medium, such that the data is reloaded as needed so as to recover memory data. Optionally, information about a specific writing address where the stored data is written into the external storage medium may be recorded, such that the correspondingly written data is queried according to the recorded information.

In an embodiment, the application to be processed may send information of data to be saved to the operating system through a preset interface, and after receiving the information, the operating system writes the data saved in the corresponding memory page into the external storage medium.

In 306, an operation of the application to be processed is paused.

The electronic device may pause the application to be processed, such that the application to be processed is in an operation paused state, and will not completely quit, so as to retain the corresponding application to be processed. In an embodiment, the electronic device may pause the application to be processed through the above-mentioned resource priority and limitation management module 222 to prevent the application to be processed from occupying excessive memory resources.

In 308, the data written into the external storage medium is written into a memory when the operation of the application to be processed is unpaused.

In an embodiment, when it is detected that the application to be processed is switched to the foreground or a starting operation for the application to be processed is received, the operation of the application to be processed is unpaused, and the operating state of the application to be processed is resumed. At this time, the data stored in the external storage medium may be written into the memory. Optionally, a new memory page may be re-allocated to the application to be processed, a pre-recorded storage address of the stored data is determined, and the data is read from the storage address and the read data is written into a memory address corresponding to the re-allocated memory page. The application to be processed may reload data in the re-allocated memory page during the operation, so as to resume the operating state.

According to the above-mentioned method for processing the application, data stored in reclaimable memory pages occupied by an application to be processed is saved, and an operation of the application to be processed is paused instead of direct quitting of the application to be processed; and when the application to be processed resumes the operation, the saved data is re-written into the memory. In such manner, operational data when the application to be processed is paused is retained, thereby preventing the reduction of the operation speed of the application to be processed when the application to be processed resumes the operation.

In an embodiment, the data stored in the reclaimable memory pages is written into the external storage medium includes that the data stored in the reclaimable memory pages is written into the external storage medium in an asynchronous transmission manner; and the data written into the external storage medium is written into the memory includes that the data written into the external storage medium is written into the memory in a synchronous transmission manner.

The asynchronous transmission is that data to be transmitted is divided into groups for transmitting, and a group may be an 8-bit-or-more character. The data to be transmitted is usually in units of bits. The synchronous transmission manner adopts a data block as a transmission unit. It is necessary to add a special character or bit sequence to the head and tail of each data block, and it is also necessary to add a check sequence (such as a 16-bit or 32-bit Cyclic Redundancy Check (CRC) code) to mark the start and end of a data block, in order to perform error control on the data block.

The electronic device may write the data stored in the memory page into the external storage medium in the asynchronous transmission manner. During the asynchronous transmission, when it is detected that the application to be processed needs to be unpaused, it is only necessary to cancel the current asynchronous transmission, thereby improving the efficiency of resuming the paused process.

When the data written into the external storage medium is written into a memory, the data may be written in a synchronous transmission manner. The synchronous transmission manner is adopted for writing instead of a gradual recovery manner for certain data used by the application to be processed, so that the recovery speed of the data for the application to be processed can be improved, thereby improving efficiency of resuming the operation of the application to be processed. Further, when the operation of the application to be processed is resumed, corresponding recovery progress information may be displayed during the recovery, so that a user may know a specific recovery state when the user is waiting, so as to avoid misoperation. For example, percentage that the data is recovered in real time may be displayed on an application awakening or starting interface.

In an embodiment, when data is written into the external storage medium, the data may be compressed and stored, so as to reduce the occupation of the storage space of the external storage medium. When the data is written into the memory, the compressed data may be decompressed, and the decompressed data is written into the memory in a synchronous transmission manner.

In an embodiment, after the operation in 304, the method further includes that an increment of the memory occupied by the application to be processed is determined; and the reclaimable memory pages occupied by the application to be processed are continuously determined when the increment is greater than a preset increase threshold.

Optionally, after the operation of the application to be processed is paused, due to the complexity of the operating system and the diversity of an operating environment, the application to be processed needs to update an own state regularly or irregularly in many cases. It is necessary to continuously resume the operation during the pausing process to ensure a correct state. Usually, the resuming only needs to last for a short time, and will not excessively increase memory consumption of the application. However, once the memory occupied by the application increases to a certain increment due to the repeated resuming of the application, the operation 302 to the operation 304 may be performed again to reclaim memory pages occupied by the application to be processed again.

A corresponding increase threshold is also set for the application to be processed. The increase threshold may be a fixed value, or may be determined according to many factors such as the memory size of the system or the number of reclaiming for memory pages. For example, different increase thresholds may be correspondingly set for different system memory sizes, or different increase thresholds may be correspondingly determined for the different number of reclaiming for memory pages. When the number of reclaiming is increasing or the system memory is increasing, the set increase threshold is also increasing.

In an embodiment, the operation 302 includes that all memory pages of a memory occupied by the application to be processed are queried; and the reclaimable memory pages are determined from all the memory pages.

Optionally, the electronic device may record memory pages of memories occupied by different applications in real time, and further record, in real time, whether each occupied memory page is reclaimable. For example, when data in a certain memory page is currently used by other applications or the application to be processed, it is determined that the certain memory page is a non-reclaimable memory page; and when it is recorded that data in the occupied memory page is not used by an application or the duration of the state in which no application uses the occupied memory page is greater than a preset duration, it is determined that the memory page is a reclaimable memory page.

All memory pages occupied by the application to be processed may be queried from the pre-recorded information, it is determined, according to the recorded using state of each memory page, whether the memory page is a reclaimable memory page, and then all reclaimable memory pages are determined.

In an embodiment, all the memory pages of the memory occupied by the application to be processed are queried includes that memory-mapped files of the application to be processed are traversed; and all the memory pages occupied by the application to be processed are queried through the memory-mapped files.

The memory-mapped files are mapping from a file to a memory. The electronic device establishes corresponding memory-mapped files for the application to be processed, the memory-mapped files are provided with memory pages occupied by the corresponding application. The memory-mapped files corresponding to the application to be processed are traversed, and the memory pages occupied by the application to be processed are read from each traversed memory-mapped file, so that all memory pages occupied by the application to be processed may be determined, and the query efficiency and query comprehensiveness of the memory pages occupied by the application to be processed are improved.

In an embodiment, the reclaimable memory pages are determined from all the memory pages includes that a memory page carrying an occupation mark is eliminated from all the memory pages; and the reclaimable memory pages are determined from all the memory pages excluding the eliminated memory page.

For all the queried memory pages occupied by the application to be processed, the electronic device may detect whether each queried memory page carries an occupation mark or whether each queried memory page is occupied by multiple applications. The occupation mark represents that data stored in the corresponding memory page is currently used by the application to be processed, or data stored in the corresponding memory page is necessary data when the application to be processed keeps normal operation. After the data is deleted, either the application to be processed cannot normally operate or it is necessary to repeatedly occupy a new memory page to store corresponding data. The electronic device may set occupation marks for memory pages storing these types of data detected, so as to indicate that the corresponding memory pages cannot be reclaimed.

The data stored in the memory page occupied by the application to be processed may also be used by other applications. That is, multiple applications use the data stored in the memory page. Occupation marks may also be set for this type of memory pages (i.e., the memory pages in which the stores data is used by multiple applications), so that the electronic device eliminates this type of memory pages likewise, so as to indicate that this type of memory pages will not be reclaimed.

The remaining memory pages of all the memory pages except the eliminated memory pages are reclaimable memory pages, and the electronic device may reclaim a memory from the remaining memory pages.

In an embodiment, the electronic device may call the resource priority and limitation management module 222 as illustrated in FIG. 2 to traverse memory-mapped files of the application to be processed; query all memory pages occupied by the application to be processed through the memory-mapped files, detect, through the resource priority and limitation management module 222, whether each memory page is a reclaimable memory page, set corresponding occupation marks for non-reclaimable memory pages, record whether each memory page is also occupied by multiple applications, eliminate a memory page carrying an occupation mark and/or a memory page occupied by multiple applications from all the queried memory pages, and determine reclaimable memory pages from all the queried memory pages excluding the eliminated memory page.

Figure 4:
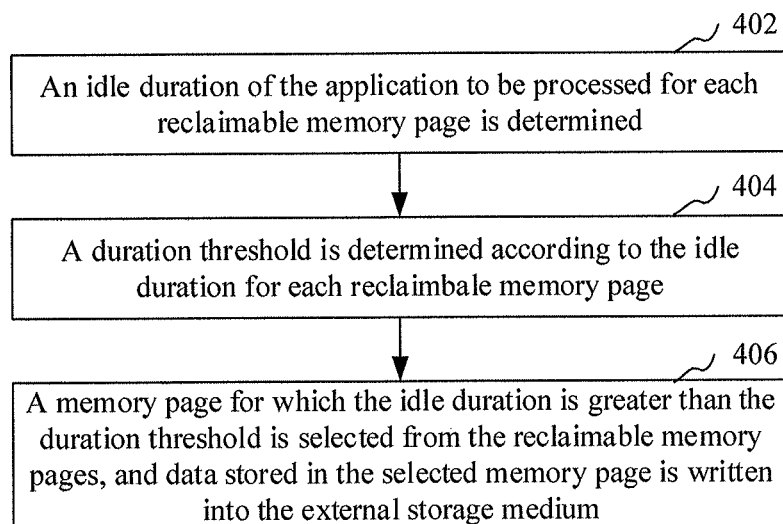
FIG. 4 is a flowchart of writing data stored in a reclaimable memory page into an external storage medium in an embodiment.

In an embodiment, as illustrated in FIG. 4, the operation in 304 includes the operations as follows.

In 402, an idle duration of the application to be processed for each reclaimable memory page is determined.

Since the data stored in the memory page is not always used by the application, the idle duration of the memory page represents a duration that the data stored in the memory page is in a non-use state after the data stored in the memory page is used recently after the system allocates a memory for the application to be processed. The electronic device updates the idle duration of each memory page in real time according to the using situation of data stored in each memory page, and may determine the latest recorded idle duration of each reclaimable memory page when it is prepared to reclaim the memory page occupied by the application to be processed.

In an embodiment, under the situation of recently initiating allocation, reclaiming, release and the like of the memory page, or under the condition of querying the using condition of a cache in the processor, it is determined that data in the correspondingly memory page involved is used, and a system time generated under the corresponding situation is taken as a time at which the data in the memory page is used recently, the difference between the current time and the recent time is the idle duration of the corresponding memory page.

In an embodiment, the electronic device may create a corresponding timestamp for each memory page, and the timestamp records a time at which the data in the corresponding memory page is used recently. In the operating system, every time the allocation, reclaiming, release and the like of the memory page are actively initiated, the activity of the corresponding memory page may be updated, and the update time is recorded in the timestamp. Or when the system checks the using condition of the cache of the processor regularly, it may be determined that data in the current cache is currently used data, a timestamp of the involved memory page is updated, and the update time is recorded in the timestamp. Optionally, a previous update time may be replaced with a latest recorded update time, so as to reduce the resource occupation of the update time.

In 404, a duration threshold is determined according to the idle duration for each reclaimable memory page.

The duration threshold represents a critical value used to determine whether to reclaim the reclaimable memory page. The duration threshold may be a fixed value, or a duration threshold determined according to the idle duration of each reclaimable memory page. If the idle durations are different, the determined duration thresholds are not necessarily the same.

In an embodiment, the duration threshold may be a weighted average value of the idle durations of all reclaimable memory pages, or an idle duration may be selected from the idle durations of all the reclaimable memory pages and the selected idle duration is taken as a duration threshold. For example, an idle duration approximate to a median or an idle duration at a certain sorted position may be selected from the idle durations of all the reclaimable memory pages, and the selected idle duration is taken as a duration threshold.

In 406, a memory page for which the idle duration is greater than the duration threshold is selected from the reclaimable memory pages, and data stored in the selected memory page is written into the external storage medium.

The electronic device may select a memory page for which the idle duration is greater than the duration threshold from the reclaimable memory pages occupied by the application to be processed according to the determined duration threshold for reclaiming, and write data stored in the selected memory page into the external storage medium, so as to release the reclaimable memory page for which the idle duration is greater than the duration threshold for use of the foreground application or other applications, thereby improving the comprehensive processing efficiency of the system. Optionally, the electronic device may reclaim the memory page from the reclaimable memory pages through the above-mentioned process memory reclaiming module 234 according to the duration threshold, write data stored in the reclaimed memory page into the external storage medium, and release a memory that has been unused for a long time, so that the usage efficiency of the memory is improved, and after the memory page is reclaimed, the influence on the application to be processed is slight.

For example, there are 100 reclaimable memory pages, the corresponding idle durations are between 5 s to 15 min, when a duration threshold determined according to the idle duration is 5 min, memory pages for which the idle duration is greater than 5 min may be reclaimed from the 100 reclaimable memory pages, and the reclaimed memory pages are released, so that the idle memory pages of the electronic device are correspondingly increased, and may be used by the foreground application or other background applications.

In the above-mentioned method, the reclaimed object is a reclaimable memory page and not all the reclaimable memory pages are necessarily reclaimed, a memory page for which the idle duration is greater than a corresponding duration threshold is selected for reclaiming according to the idle duration for each reclaimable memory page, thus the influence on the operation of the application to be processed is reduced. Moreover, the reclaimed memory page may be released for use of other applications, thereby ensuring that the adverse impact on each application is minimized when the entire system memory is increased, improving usage efficiency of the memory, and maintaining the balance between the reclaiming of the memory of the application to be processed and the operation of the application to be processed.

In an embodiment, the operation in 402 includes that update time recorded by a timestamp of each reclaimable memory page is determined, and the idle duration for corresponding to the reclaimable memory page is calculated according to the update time.

The electronic device may create a timestamp for each memory page through the above-mentioned resource priority and limitation management module 222, the timestamp is used to record the corresponding update time, and the update time represents a time at which the corresponding memory page is used recently. When it is detected that the memory in each memory page is used, the update time recorded by the timestamp may be updated.

Under the situation of recently initiating allocation, reclaiming, release and the like of the memory page, or under the condition of querying the using condition of a cache in the processor, it is determined that data in the correspondingly memory page involved is used, and a system time under the corresponding situation is generated as the update time. When a memory reclaiming mechanism starts to be executed, the idle duration of the corresponding memory page may be calculated according to the update time recorded by the timestamp and the current system time. The difference between the current time and the recent time is the idle duration of the corresponding memory page.

The update time of each reclaimable memory page is recorded in a manner of creating a timestamp through software, and the idle duration is determined according to the update time, so that different processors may be effectively compatible, and the universality of memory reclaiming is improved.

In an embodiment, the operation in 402 includes that update time of each reclaimable memory page recorded through an LRU management unit is determined, and the idle duration corresponding to reclaimable memory page is calculated according to the update time.

A corresponding LRU management unit is disposed in a memory management or cache unit in the processor for statistics on the recently used memories. The LRU management unit may record each memory address and update time of the memory address, and when the memory corresponding to a certain address is used, the processor stores the corresponding memory address and update time into the LRU management unit. When a memory reclaiming mechanism starts to be executed, a memory page corresponding to each memory address may be known according to correspondences between the memory addresses and the memory pages, so that the update time of the corresponding memory page may be read from the LRU management unit. Under the situation of recently initiating allocation, reclaiming, release and the like of the memory page, or under the condition of querying the using condition of a cache in the processor, it is determined that data in the correspondingly memory page involved is used, and a system time under the corresponding situation is generated as the update time.

When the LRU management unit is filled, interruption information may be generated and notified to the operating system, and the operating system may empty data in the LRU management unit after reading the data in the LRU management unit, so that the LRU management unit may restart working to store information such as each memory address and the update information corresponding to each memory address.

In the embodiment, an LRU management unit is created in order to accurately track the using condition of each memory, thereby improving the detection accuracy of the update time of the memory page, and also improving the convenience of memory reclaiming.

In an embodiment, the operation in 404 includes that an average idle duration of the application to be processed for the reclaimable memory pages is calculated according to the idle duration for each reclaimable memory page, and the average idle duration is taken as the duration threshold.

The average idle duration may be an average value of idle durations for reclaimable memory pages occupied by the application to be processed. The electronic device may call the corresponding calculation unit to perform calculation according to the counted occupation duration of each memory page, so as to calculate the average idle duration and take the average idle duration as a duration threshold.

The average idle duration is taken as a duration threshold, the calculation efficiency of the duration threshold may be improved, and the calculation is simple, so as to correspondingly improve the efficiency of memory reclaiming.

In an embodiment, the duration threshold is determined according to the idle duration for each reclaimable memory page includes that a number of reclaiming for the reclaimable memory pages is determined; a $K^{th}$-largest idle duration is selected from the idle duration for each reclaimable memory page according to the number of the reclaiming, and the selected idle duration is taken as a duration threshold, here, the number of reclaimable memory pages of which the idle durations are greater than the $K^{th}$-largest idle duration is the number of the reclaiming.

The number of the reclaiming is the number of the reclaiming for memory pages, and the number of the reclaiming is a positive integer. The number of the reclaiming may be determined according to at least one of the priority of the application to be processed, the total number of reclaimable memory pages occupied by the application to be processed, the idle duration or the like. Optionally, the number of the reclaiming may be negatively correlated to the priority of the corresponding application, and positively correlated to the total number of the reclaimable memory pages. When the priority of the corresponding application is lower, the number of the reclaiming is larger accordingly; and when the total number of the reclaimable memory pages is larger, the corresponding number of the reclaiming is also larger.

The electronic device may sort the idle duration of each reclaimable memory page in a descending order, and select the $K^{th}$-largest idle duration as the duration threshold. The number of reclaimable memory pages for which idle durations are greater than the $K^{th}$-largest idle duration is the number of the reclaiming. It may be understood that K is a natural number greater than the number of the reclaiming. For example, the total number of reclaimable memory pages is 100, when the determined number of the reclaiming is 50, the $51^{st}$-largest idle duration may be selected from the idle durations of the 100 reclaimable memory pages as the duration threshold, and 50 reclaimable memory pages for which the idle durations are greater than the $51^{st}$-largest idle duration are selected for reclaiming.

The $K^{th}$-largest idle duration is selected as the duration threshold, so that the reclaiming flexibility of reclaimable memory pages is improved.

In an embodiment, the number of the reclaiming for the reclaimable memory pages is determined includes that a reclaiming proportion corresponding to the application to be processed is determined; and the number of the reclaiming is determined according to the reclaimable memory pages and the reclaiming proportion.

The reclaiming proportion represents a proportion of reclaiming of memories to be reclaimed, and the reclaiming proportion is used to guide the magnitude of reclaiming reclaimable memories. For example, the reclaiming portion is 50%, which represents that 50% of occupied memories may be reclaimed. The electronic device presets reclaiming proportions corresponding to different applications. Optionally, correspondences between different reclaiming proportions and application identifiers may be established, and the electronic device may determine the corresponding reclaiming proportion according to the correspondences between the application identifier of the application to be processed and the reclaiming proportion. The application identifier is used to uniquely identify an application, and may be constituted by one or more of a preset digit of number, letter or other characters.

In an embodiment, the reclaiming proportion may be determined according to the secondary starting duration of the application to be processed, and the electronic device may pre-test reclaiming of reclaimable memory pages occupied by the application to be processed according to different proportions. The electronic device detects a starting duration needed when the application to be processed is re-started after the memory pages corresponding to the proportion are reclaimed, here, the starting duration is the secondary starting duration. The electronic device determines a relatively appropriate proportion according to the secondary starting duration corresponding to different proportions, and takes the determined proportion as the reclaiming proportion corresponding to the application to be processed.

The number of the reclaiming may be a product of the total number of reclaimable memory pages and the determined reclaiming proportion. When the product is not an integer, an integer approximate to the product may be selected. For example, a most approximate integer may be determined as the number of the reclaiming in a round-off manner, or a corresponding integer may be determined as the number of the reclaiming according to methods such as a truncation method or a carry method.

For example, the number of the reclaiming is determined in the round-off manner. For example, when there are 100 reclaimable memory pages, if the reclaiming proportion is 30.5% and an obtained product is 30.5, 31 reclaimable memory pages may be reclaimed from the 100 reclaimable memory pages, and if the reclaiming proportion is 21.2%, 21 reclaimable memory pages may be reclaimed.

The reclaiming proportion corresponding to the application to be processed is determined and then the number of the reclaiming is determined according to the reclaiming proportion, so that the flexibility of determination for the number of the reclaiming may be further improved.

In an embodiment, the reclaiming proportion corresponding to the application to be processed is determined includes that an application type of the application to be processed is determined; and a reclaiming proportion calculated according to a reclaiming model corresponding to the application type is determined.

The application type is a type set according to the influence on the operation of the application to be processed after the memory is reclaimed. The application type includes an unrelated type, a linear type and a non-linear type. The unrelated type represents no remarkable influence on the corresponding application regardless of the number of the reclaiming after reclaimable memories of the application to be processed are reclaimed. The linear type represents that with the increase of the reclaiming proportion of the reclaimable memories, the secondary starting duration of the corresponding application is also increased, here, there is a linear or approximately linear increase relationship between the secondary starting duration and the reclaiming proportion. The non-linear type represents other types neither the unrelated type nor the linear type. The no remarkable influence represents that an exceeding proportion of secondary starting durations corresponding to different reclaiming proportions relative to a normal starting duration is smaller than a preset proportion range. The approximately linear increase represents that an error between a secondary starting duration fitted by different reclaiming proportions according to the corresponding approximate slope and a secondary starting duration under the corresponding reclaiming proportion does not exceed an error within a preset range.

The electronic device sets, for different applications, an application type corresponding to an application according to the influence on the application after the memories are reclaimed according to different reclaiming proportions. The electronic device further sets a corresponding reclaiming model for each application type, and calculates, according to the reclaiming model, the size of the secondary starting duration corresponding to the application type after reclaimable memory pages are reclaimed according to different proportions.

An optimal reclaiming proportion is determined according to different reclaiming proportions and the secondary starting durations corresponding to the different reclaiming proportions, so that under the condition of keeping the secondary starting duration not greatly increased relative to the normal starting duration, the reclaiming proportion is the maximum, and the optimal reclaiming proportion is determined.

In an embodiment, when the application type of the application to be processed is the unrelated type, the reclaiming proportion calculated through the reclaiming model may be 100%, that is, the reclaimable memory page may be reclaimed by 100%. When the application type of the application to be processed is the non-linear type, an appropriate proportion may be selected as the reclaiming proportion, so that the cost performance between the number of the reclaimed memory pages and the secondary starting duration of the corresponding application is highest. For example, a proportion corresponding to the secondary starting duration which is a preset duration threshold may be selected, and the selected proportion is taken as the reclaiming proportion. or a proportion corresponding to the secondary starting duration which is a preset multiple of a normal starting duration may be selected, and the selected proportion is taken as the reclaiming proportion. The preset duration threshold or the preset multiple may be an appropriate value set according to an empirical value. For example, the preset duration threshold may be 2 s or 3 s, and the preset multiple may be 1.5 or 2.

When the application type of the application to be processed is the linear type, the corresponding reclaiming proportions may be determined according to different slopes, herein, the slope represents the magnitude of inclination of a curve formed by the corresponding secondary starting durations under different reclaiming proportions relative to the reclaiming proportion. As the slope is larger, the determined reclaiming proportion is relatively smaller, so as to maintain the balance between the reclaiming of the memory of the application to be processed and operation of the application to be processed.

Figure 5A:
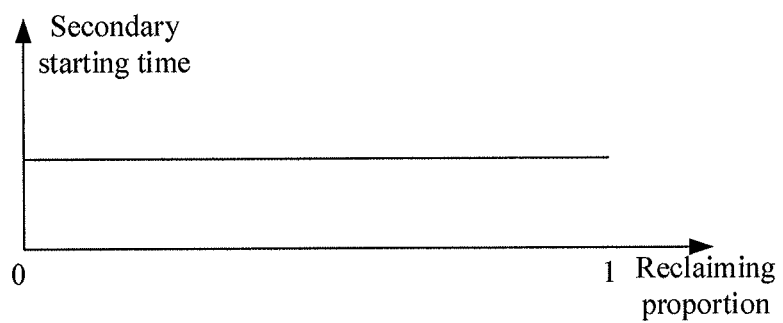
FIG. 5A is a curve diagram of a reclaiming proportion of for an unrelated application in an embodiment.
Figure 5B:
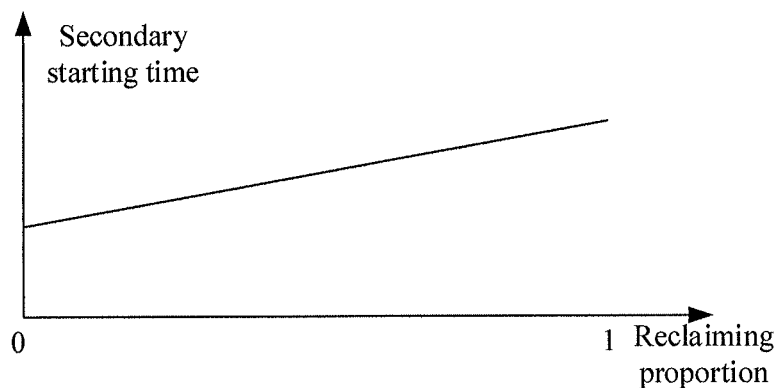
FIG. 5B is a curve diagram of a reclaiming proportion for a linear application in an embodiment.
Figure 5C:
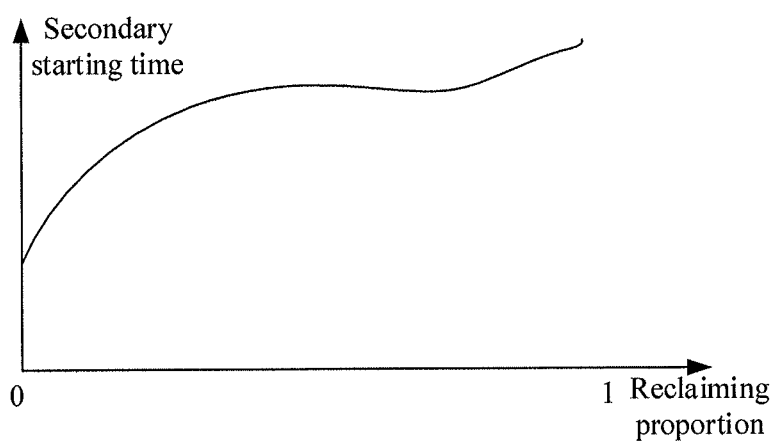
FIG. 5C is a curve diagram of a reclaiming proportion for a non-linear application in an embodiment.

For example, as illustrated in FIG. 5A, FIG. 5B and FIG. 5C, reclaiming proportion curves of unrelated, linear and non-linear applications in an embodiment are provided respectively. The horizontal coordinate in the reclaiming proportion curve represents a reclaiming proportion, and the vertical coordinate represents a secondary starting duration under the corresponding reclaiming proportion. The reclaiming proportion curve of the unrelated applications reflects that the corresponding secondary starting duration of the corresponding application does not change or slightly changes after reclaimable memory pages of the corresponding application are reclaimed according to different reclaiming proportions. The corresponding slope of the reclaiming proportion curve of the linear applications does not change or slightly changes under different reclaiming proportions. But the reclaiming proportion curve of the non-linear applications is partially large in slope and partially small in slope. For non-linear applications, a reclaiming proportion corresponding to the minimum slope may be selected as the reclaiming proportion of reclaimable memory pages.

Figure 6:
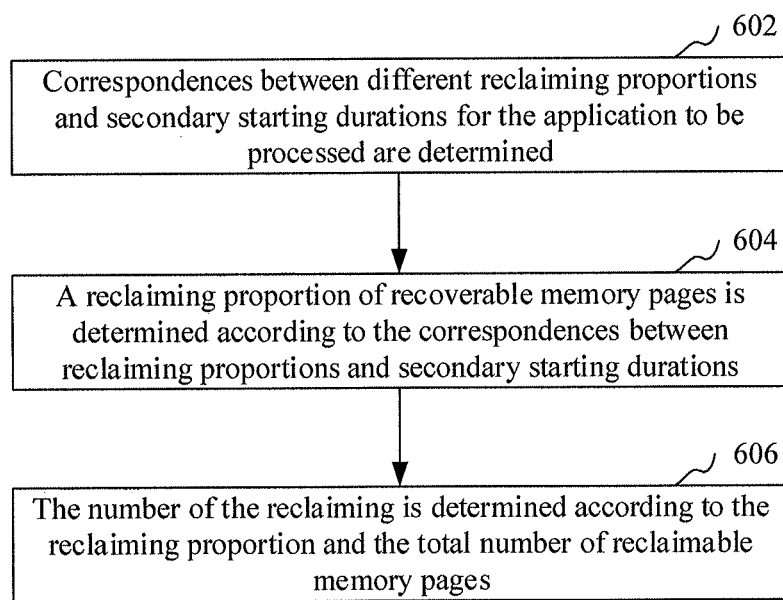
FIG. 6 is a diagram of determining the number of reclaiming for reclaimable memory pages in an embodiment.

In an embodiment, as illustrated in FIG. 6, the number of the reclaiming for the reclaimable memory pages is determined includes the operations as follows.

In 602, correspondences between different reclaiming proportions and secondary starting durations for the application to be processed are determined.

The reclaiming proportion represents a proportion of reclaiming of memories to be reclaimed, and the reclaiming proportion is used to guide the magnitude of reclaiming reclaimable memories. For example, the reclaiming portion is 50%, which represents that 50% of occupied memories may be reclaimed. The secondary starting duration refers to a duration for restarting the application to be processed after reclaimable memory pages occupied by the application to be processed are reclaimed according to the corresponding reclaiming proportion.

The electronic device may set correspondences between corresponding reclaiming proportions and secondary starting durations for each application. The correspondences represent corresponding secondary starting durations after reclaimable memories are reclaimed from memories occupied by the application according to different reclaiming proportions. Optionally, the correspondences may be a comparison table between a corresponding reclaiming proportion and a secondary starting duration, or a reclaiming proportion curve. The curve is corresponding secondary starting durations under different reclaiming proportions.

In 604, a reclaiming proportion of reclaimable memory pages is determined according to the correspondences between reclaiming proportions and secondary starting durations.

In 606, the number of the reclaiming is determined according to the reclaiming proportion and the total number of reclaimable memory pages.

Optionally, the electronic device may set a corresponding starting duration threshold, and when the second starting duration reaches the starting duration threshold, the proportion corresponding to the second starting duration is determined as the reclaiming proportion of reclaimable memory pages. The starting duration threshold may be a preset empirical value, and further, starting duration thresholds corresponding to different applications may not be necessarily the same. For example, the corresponding starting duration threshold may be determined according to a normal starting duration of the corresponding application, and a duration which is 1.5 or 2 times the normal starting duration is taken as the starting duration threshold.

An appropriate reclaiming proportion is selected according to the correspondences with reference to different secondary starting durations and taken as the reclaiming proportion of reclaimable memory pages occupied by the application, thus maintaining the balance between the reclaiming of the memory of the application to be processed and operation of the application to be processed.

Figure 7:
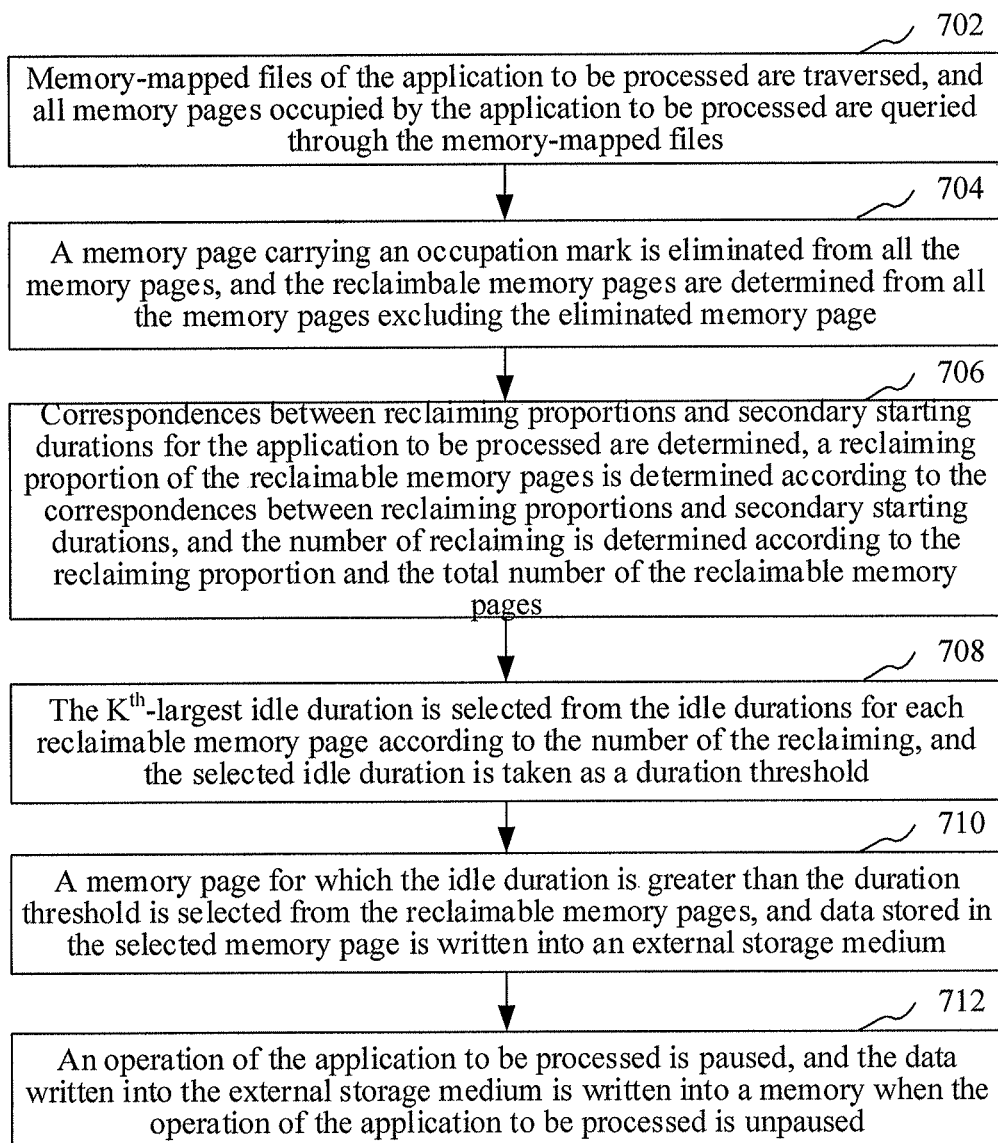
FIG. 7 is a flowchart of a method for processing an application in another embodiment.

In an embodiment, as illustrated in FIG. 7, another method for processing an application is provided. The method includes the operations as follows.

In 702, memory-mapped files of an application to be processed are traversed, and all memory pages occupied by the application to be processed are queried through the memory-mapped files.

In an embodiment, the electronic device may trigger a memory reclaiming mechanism when it is detected that the memory usage of the system exceeds a preset proportion or a memory reclaiming instruction triggered by a user operation is received, and determine an application of which the memory needs to be reclaimed from all operating applications, the determined application is the application to be processed.

In an embodiment, after the electronic device detects that a certain application is switched from the foreground to the background and sets the application to a process deep freezing mode through the platform freezing management module 224, the electronic device may trigger a memory reclaiming mechanism of the application.

The electronic device may traverse memory-mapped files of the application to be processed through the above-mentioned resource priority and limitation management module 222, and query a memory page occupied by the application to be processed from each traversed memory-mapped file, so that all memory pages occupied by the application to be processed can be queried.

In 704, a memory page carrying an occupation mark is eliminated from all the memory pages, and the reclaimable memory pages are determined from all the memory pages excluding the eliminated memory page.

Secondary traversal may be performed on each queried memory page, the secondary traversal is used to detect whether each queried memory page is a reclaimable memory page, when a memory page carrying an occupation mark is detected, it is determined that the memory page is a non-reclaimable memory page, the memory page is eliminated, the memory pages obtained after the secondary traversal are reclaimable memory pages, and the electronic device may select a memory page for reclaiming from all the reclaimable memory pages. The secondary traversal may improve the detection comprehensiveness of reclaimable memory pages.

In 706, correspondences between reclaiming proportions and secondary starting durations for the application to be processed are determined, a reclaiming proportion of the reclaimable memory pages is determined according to the correspondences between the reclaiming proportions and the secondary starting durations, and the number of reclaiming is determined according to the reclaiming proportion and the total number of reclaimable memory pages.

The secondary starting duration refers to a duration for restarting the application to be processed after reclaimable memory pages occupied by the application to be processed are reclaimed according to the corresponding reclaiming proportion. The correspondences may be a comparison table between a corresponding reclaiming proportion and a secondary starting duration, or a reclaiming proportion curve. The curve is corresponding secondary starting durations under different reclaiming proportions, and the curve may be the curve as illustrated in FIG. 5A to FIG. 5C.

The electronic device may determine a relatively appropriate reclaiming proportion according to the curve in accordance with different application types. The reclaiming proportion and the total number of reclaimable memory pages are multiplied to obtain a product, and an integer approximate to the product is taken as the number of the reclaiming.

In 708, the $K^{th}$-largest idle duration is selected from the idle duration for each reclaimable memory page according to the number of the reclaiming, and the selected idle duration is taken as a duration threshold.

The number of reclaimable memory pages for which the idle durations are greater than the $K^{th}$-largest idle duration is the number of the reclaiming, and the $K^{th}$-largest idle duration is the duration threshold. The numbers of the reclaiming determined by different reclaiming proportions are different, and corresponding K values are different under different number of the reclaiming, that is, duration thresholds are different. For example, the total number of reclaimable memory pages is 100, when the reclaiming proportion is 50%, the corresponding reclaiming number is 50, K=51, and the duration threshold is the $51^{st}$-largest idle duration; and when the reclaiming proportion is 30.3%, the corresponding reclaiming number is 30, K=31, and the duration threshold is the $31^{st}$-largest idle duration.

In 710, a memory page for which the idle duration is greater than the duration threshold is selected from the reclaimable memory pages, and data stored in the selected memory page is written into an external storage medium.

The electronic device may reclaim the memory page from the reclaimable memory pages through the above-mentioned process memory reclaiming module 234 according to the duration threshold, and release a memory that has been unused for a long time, so that the memory usage is improved, and after the memory page is reclaimed, the influence on the application to be processed is slight.

In 712, an operation of the application to be processed is paused, and the data written into the external storage medium is written into a memory when the operation of the application to be processed is unpaused.

The electronic device may perform pausing and unpausing of the operation of the application to be processed through the resource priority and limitation management module 222. When the operation of the application to be processed is unpaused, the data written into the external storage medium may be written into a memory, so as to recover application data.

For example, when the application to be processed is a certain game application, the reclaimed data generated by the game application is re-written into a memory, and after the game application is unpaused, the game application may reload the written data, so that information such as game progress during pausing may be recovered, thereby avoiding loss of information such as the game progress.

In an embodiment, before determining the reclaimable memory pages occupied by the application to be processed, the method further includes that it is detected whether a foreground application is dependent on the application to be processed; when the foreground application is dependent on the application to be processed, a priority of the application to be processed is adjusted to match a priority of the foreground application; and when the foreground application is not dependent on the application to be processed, the reclaimable memory pages occupied by the application to be processed are determined.

In an embodiment, when the foreground application ends the dependency on the application to be processed, the reclaimable memory pages occupied by the application to be processed are determined.

The dependency represents that an application can smoothly implement normal operation of the application by using data of another or more applications. Two applications having a dependency relationship are a depended application and a depending application respectively, and the electronic device determines the detected application to be processed which is depended by a foreground application and which operates in the background, as a background application depended by the foreground application. The electronic device may set a corresponding depended mark for the detected background application depended by the foreground application, determine a background application with the depended mark from a background application pool, and determine the background application as the background application depended by the foreground application. The foreground application is an application operating in the foreground.

If the application to be processed is depended by the foreground application, the application to be processed may be determined as an application depended by the foreground application, and the priority of the application to be processed which is depended by the foreground application is adjusted to match the priority of the foreground application.

Optionally, the electronic device may adjust the priority of the queried application to be processed which is depended by the foreground application, so that the adjusted priority matches the priority of the foreground application. The electronic device may set a matching relationship between the priority of the application to be processed which is depended by the foreground application and the priority of the foreground application. The corresponding priority applicable to the application to be processed which is depended by the foreground application is determined according to the matching relationship, and a priority of the application to be processed which is depended by the foreground application is adjusted to the determined corresponding priority, so that the limitation degree of resources of the application to be processed which is depended by the foreground application is reduced, and the limitation degree of resources available for the application to be processed which is depended by the foreground application matches the limitation degree of resources available for the foreground application.

In an embodiment, the priority matching the priority of the foreground application may be the priority which is the same as the priority of the foreground application. That is, the electronic device may adjust the priority of the application to be processed which is depended by the foreground application to the priority which is the same as the priority of the foreground application, so that the limitation degree of resources available for the application to be processed which is depended by the foreground application is the same as the limitation degree of resources available for the foreground application.

The priority of the application to be processed which is depended by the foreground application is adjusted to the priority matching the priority of the foreground application by detecting a dependency relationship on the application to be processed. Since the priority of the foreground application is highest usually, the corresponding limitation degree of available resources is lowest, and the priority of a background process is lower, so as to prevent influence on the foreground application due to occupation of excessive resources by the background process. However, there is a situation that the background process is depended by the foreground application, and the execution efficiency of the depended background process may also affect the foreground application. In the embodiments of the disclosure, the priority of the depended application to be processed is adjusted to the priority matching the priority of the foreground application, the limitation degree of resources available for the depended application to be processed may be reduced, and the processing efficiency of the depended application to be processed is improved. The processing efficiency of the depended application to be processed is improved, so that the processing efficiency of the foreground application depending on the depended application to be processed is also improved.

In an embodiment, when socket communication, binder communication, memory share or lock waiting exists between the application to be processed and the foreground application, it is determined that a communication mechanism exists between the background process and the foreground application.

It may be detected whether a background process having a communication mechanism with the foreground application exists in any one or more of the following manners.

(1) Detecting whether a background process having socket communication and/or binder communication with the foreground application exists.

(2) Detecting whether a background process having memory share with the foreground application exists.

(3) Detecting whether a background process waiting on lock resources with the foreground application exists.

The electronic device may provide a detection mechanism for detecting whether binder communication exists between the foreground application and the background process in a binder drive, call the detection mechanism provided in the binder drive to detect the background process having binder communication with the foreground application, and determine the detected background process as the background process depended by the foreground application.

In an embodiment, the electronic device may detect various lock resources, and the lock resources include a thread lock, a file handle, a signal and the like. It may be detected whether lock waiting namely lock resource waiting occurs to each lock resource. When it is detected that lock waiting is generated, it may be further detected whether the waiting behavior occurs on the foreground application. If so, all background processes waiting on the lock resource are traversed, and the detected background processes waiting on the lock resource are determined as the background process depended by the foreground application.

In an embodiment, the electronic device may provide a lock resource monitoring module and a priority adjustment module in a kernel space of the operating system, and embed the lock resource monitoring module into a native waiting interface of the kernel. The electronic device detects, through the lock resource monitoring module, whether a waiting occurs on various lock resources such as the thread lock, the file handle and the signal wait, and whether the waiting behavior occurs on the foreground application, and sends a detected message to the priority adjustment module when the waiting behavior occurs on the foreground application. The electronic device traverses all background processes waiting on the lock resource through the priority adjustment module, and determines these background processes as the background process depended by the foreground application. The electronic device adjusts the priority of the corresponding application to be processed to the matching priority through the priority adjustment module.

In an embodiment, when a synchronization mechanism exists between the background process and the foreground application, the application to be processed having the synchronization mechanism with the foreground application is determined as the background process depended by the foreground application.

The electronic device may also detect, by calling a futex system call, whether a background process having the synchronization mechanism with the foreground application exists in a background process set, and determine the background process having the synchronization mechanism as the background process depended by the foreground application.

In concurrent programming, the access of each process to a public variable must be restricted, and this restriction is referred to as synchronization. In the operating system, a synchronization mechanism of a user mode may be implemented by calling the futex system call. The user mode refers to a non-privileged state. The synchronization mechanism includes a semaphore, an exclusive lock or the like. When it is detected by calling the futex system call that a background process having any one synchronization mechanism with the foreground application exists, the detected background process may be determined as the background process depended by the foreground application.

At least one of a communication mechanism or a synchronization mechanism between the foreground application and the background process is detected, and the detected background process having the communication mechanism and/or the synchronization mechanism with the foreground application is determined as the background process depended by the foreground application, so that the detection efficiency of the application to be processed which is depended by the foreground application can be improved.

It should be understood that although various operations in the flowchart in FIG. 3, FIG. 4, FIG. 6 and FIG. 7 are displayed in sequence according to the indication of an arrow, these operations are not necessarily performed in the sequence indicated by the arrow. Unless expressly stated herein, there is no strict sequence limitation to these operations, which may be performed in other sequences. Moreover, at least some operations in FIG. 3, FIG. 4, FIG. 6 and FIG. 7 may include multiple sub-operations or multiple stages, these sub-operations or stages are not necessarily performed and completed at the same moment but may be performed at different moments, and these sub-operations or stages are not necessarily performed sequentially but may be performed by rotation or alternately with at least some of other operations or sub-operations or stages of the other operations.

Figure 8:
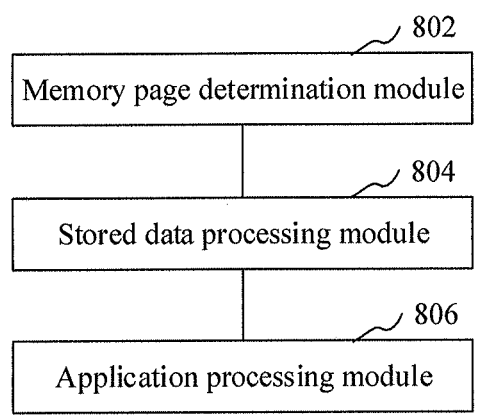
FIG. 8 is a structure block diagram of a device for processing an application in an embodiment.

In an embodiment, as illustrated in FIG. 8, a device for processing an application is provided. The device includes a memory page determination module 802, a stored data processing module 804 and an application processing module 806. The memory page determination module 802 is configured to determine reclaimable memory pages occupied by an application to be processed; the stored data processing module 804 is configured to write data stored in the reclaimable memory pages into an external storage medium, and write the data written into the external storage medium into a memory when an operation of the application to be processed is unpaused; and the application processing module 806 is configured to pause the operation of the application to be processed.

In an embodiment, the stored data processing module 804 is further configured to write the data stored in the reclaimable memory pages into the external storage medium in an asynchronous transmission manner, and write the data written into the external storage medium into the memory in a synchronous transmission manner.

In an embodiment, the stored data processing module 804 is further configured to determine an increment of the memory occupied by the application to be processed; and the memory page determination module 802 is further configured to determine, when the increment is greater than a preset increase threshold, the reclaimable memory pages occupied by the application to be processed.

In an embodiment, the memory page determination module 802 is further configured to traverse memory-mapped files of the application to be processed; query, through the memory-mapped files, all memory pages occupied by the application to be processed; eliminate a memory page carrying an occupation mark from all the memory pages; and determine the reclaimable memory pages from all the memory pages excluding the eliminated memory page.

Figure 9:
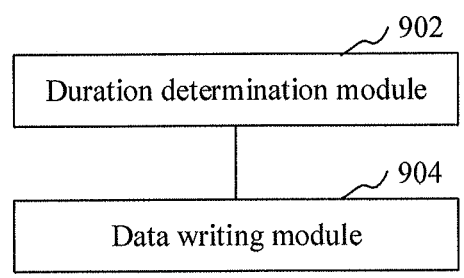
FIG. 9 is a structure block diagram of a stored data processing module in an embodiment.

In an embodiment, as illustrated in FIG. 9, the stored data processing module includes a duration determination module 902 and a data writing module 904.

The duration determination module 902 is configured to determine an idle duration of the application to be processed for each reclaimable memory page, and determine a duration threshold according to the idle duration for each reclaimable memory page; and The data writing module 904 is configured to select a memory page for which the idle duration is greater than the duration threshold from the reclaimable memory pages, and write data stored in the selected memory page into the external storage medium.

In an embodiment, the duration determination module 902 is further configured to determine update time recorded by a timestamp of each reclaimable memory page, and calculate the idle duration corresponding to the reclaimable memory page according to the update time.

In an embodiment, the duration determination module 902 is further configured to determine update time of each reclaimable memory page recorded by an LRU management unit, and calculate the idle duration corresponding to reclaimable memory page according to the update time.

In an embodiment, the duration determination module 902 is further configured to calculate an average idle duration of the application to be processed for the reclaimable memory pages according to the idle duration for each reclaimable memory page, and take the average idle duration as the duration threshold.

In an embodiment, the duration determination module 902 is further configured to determine a number of reclaiming for the reclaimable memory pages, select a $K^{th}$-largest idle duration from the idle duration for each reclaimable memory page according to the number of the reclaiming, and take the selected idle duration as the duration threshold, here, the number of reclaimable memory pages for which idle durations are greater than the $K^{th}$-largest idle duration is the number of the reclaiming, and K is a natural number not greater than the number of the reclaiming.

Figure 10:
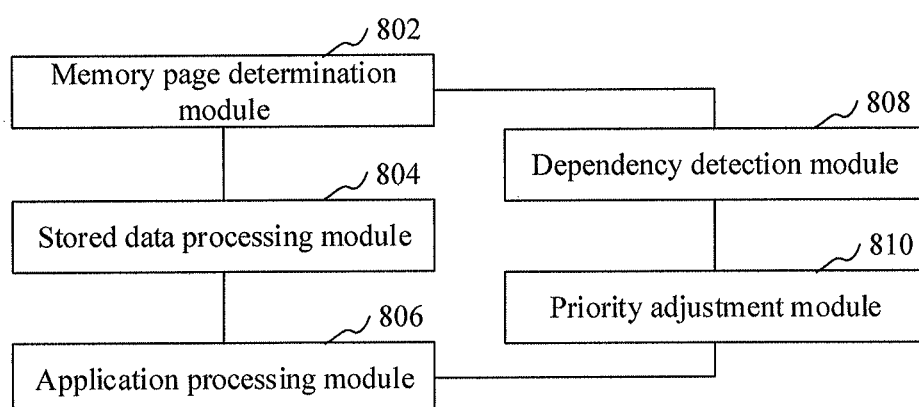
FIG. 10 is a structure block diagram of a device for processing an application in another embodiment.

In an embodiment, as illustrated in FIG. 10, another device for processing an application is provided. The device further includes a dependency detection module 808 and a priority adjustment module 810.

The dependency detection module 808 is configured to detect whether a foreground application is dependent on the application to be processed.

The priority adjustment module 810 is configured to adjust, when the foreground application is dependent on the application to be processed, a priority of the application to be processed to match a priority of the foreground application. The division of each module in the above-mentioned device for processing the application is only for illustration, and in other embodiments, the device for processing the application may be divided into different modules as needed to complete all or some functions of the above-mentioned device for the processing the application. Specific limitations about the device for processing the application may refer to limitations to the method for processing the application, and will not be elaborated herein. Various modules in the above-mentioned device for processing the application may be implemented by software, hardware or a combination thereof totally or partially. Various modules may be embedded into or independent from the processor of the electronic device in the form of hardware, and may also be stored in the memory of the electronic device in the form of software, so that the processor calls to perform the operation corresponding to each module.

Each module in the device for processing the application provided in the embodiments of the disclosure may be implemented in the form of a computer program. The computer program may operate on the electronic device such as a terminal or a server. A program module formed by the computer program may be stored on the memory of the electronic device. The computer program is executed by a processor to implement the operations of the method for processing the application described in the embodiments of the disclosure.

In an embodiment, an electronic device is provided, which includes a memory, a processor and a computer program stored on the memory and runnable on the processor, the processor is configured to execute the computer program to implement the operations of the method for processing the application provided in various embodiments.

In an embodiment, a computer-readable storage medium is also provided, which has stored thereon a computer program that when executed by a processor to implement the operations of the method for processing the application described in various embodiments of the disclosure.

In an embodiment, a computer program product is provided. The computer program product includes an instruction that when operated on a computer cause the computer to perform the method for processing the application described in various embodiments of the disclosure.

Figure 11:
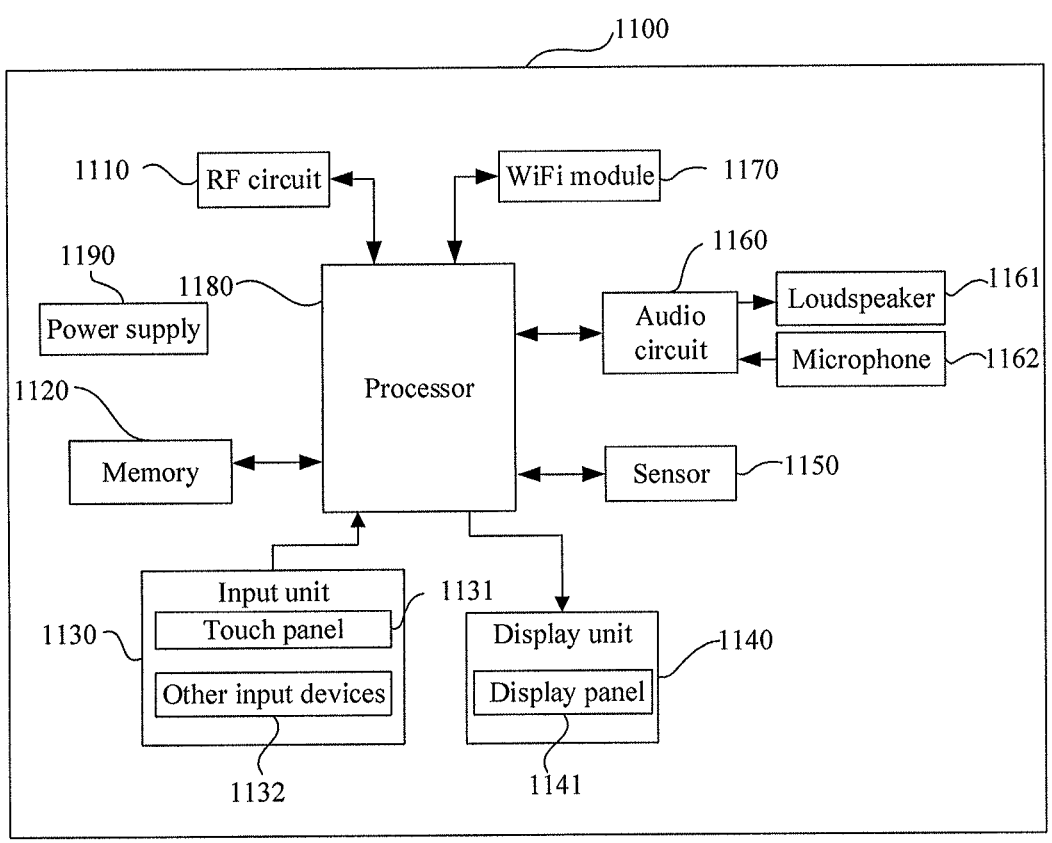
FIG. 11 is a block diagram of a partial structure of a mobile phone in an embodiment.

The embodiments of the disclosure also provide a computer device. As illustrated in FIG. 11, for convenience of description, only parts associated with the embodiments of the disclosure are illustrated. Specific technical details that are not disclosed refer to parts of the method in the embodiments of the disclosure. The computer device may be any terminal device including a mobile phone, a tablet computer, a Personal Digital Assistant (PDA), a Point of Sales (POS), an on-board computer, and a wearable device. For example, a mobile phone is taken as the computer terminal.

FIG. 11 is a block diagram of a partial structure of a mobile phone associated with a computer terminal according to an embodiment of the disclosure. Referring to FIG. 11, the mobile phone includes a Radio Frequency (RF) circuit 1110, a memory 1120, an input unit 1130, a display unit 1140, a sensor 1150, an audio circuit 1160, a Wireless Fidelity (WiFi) module 1170, a processor 1180, a power supply 1190, and other components. A person skilled in the art may understand that a structure of a mobile phone illustrated in FIG. 11 is not limitative to the mobile phone, and the mobile phone may include more or fewer components than those illustrated in the figure, or combination of some components, or different arrangements of components.

The RF circuit 1110 may be configured to receive and send a signal during information receiving and transmitting or during a call, may receive downlink information from a base station and then send the information to the processor 1180 for processing, or may send uplink data to the base station. Usually, the RF circuit includes, but is not limited to an antenna, at least one amplifier, a transceiver, a coupler, a Low Noise Amplifier (LNA), a duplexer, etc. In addition, the RF circuit 1110 may further communicate with other devices via wireless communication and a network. The wireless communication may use any one communication standard or protocol, including, but not limited to a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The memory 1120 may be configured to store a software program and a module, and the processor 1180 executes various function APPs and data processing of the mobile phone by running the software program and the module stored in the memory 1120. The memory 1120 may mainly include a storage program region and a storage data region. The storage program region may store an operation system, an APP needed for at least one function (an application program of a sound playing function, an application program of an image playing function, etc.), etc. The storage data region may store data (audio data, contacts, etc.) created according to use of the mobile phone. In addition, the memory 1120 may include a high-speed random access memory (RAM), and may further include a non-volatile memory such as a disk storage device, a flash device, or other non-volatile solid storage devices.

The input unit 1130 may be configured to receive input digital or character information and generate key signal input associated with user setting and functional control of the mobile phone 1100. Specifically, the input unit 1130 may include a touch panel 1131 and other input devices 1132. The touch panel 1131 also referred to as a touch screen, the touch panel may collect touch operations of a user thereon or nearby (such as an operation of the user on the touch panel 1131 or nearby the touch panel 1131 by using any suitable objects or attachments such as a finger or a stylus), and drives a corresponding connecting device according to a preset program. In an embodiment, the touch panel 1131 may include a touch detection apparatus and a touch controller. The touch detection apparatus detects the touch orientation of the user, detects a signal generated by the touch operation, and transmits the signal to the touch controller. The touch controller receives touch information from the touch detection apparatus, converts the received touch information into touch coordinates, transmits the touch coordinates to the processor 1180; and can receive a command sent by the processor 1180 and execute the command. In addition, the touch panel 1131 may be implemented by using multiple types such as resistance, capacitance, infrared rays and surface acoustic wave. The input unit 1130 may further include, in addition to the touch panel 1131, other input devices 1132. Specifically, the other input devices 1132 may include, but are not limited to one or more of a physical keyboard, a functional key (such as a volume control key and a switch key), etc.

The display unit 1140 may be configured to display information input by the user or information provided for the user or various menus of the mobile phone. The display unit 1140 may include a display panel 1141. In an embodiment, the display panel 1141 may be configured in a form of a Liquid Crystal Display (LCD), an Organic Light-Emitting Diode (OLED), etc. In an embodiment, the touch panel 1131 may cover the display panel 1141, when the touch panel 1131 detects the touch operation thereon or nearby, the touch operation is transmitted to the processor 1180 to determine the type of a touch event, and then the processor 1180 provides a corresponding visual output on the display panel 1141 according to the type of the touch event. Although the touch panel 1131 and the display panel 1141 implement input of the mobile phone and input functions by serving as two independent components in FIG. 11, the touch panel 1131 and the display panel 1141 may be integrated to implement the input of the mobile phone and the input functions in some embodiments.

The mobile phone 1100 may further include at least one sensor 1150 such as a light sensor, a motion sensor and other sensors. Specifically, the light sensor may include an ambient light sensor and a proximity sensor, the ambient light sensor may adjust the luminance of the display panel 1141 according to the brightness of ambient light, and the proximity sensor may close the display panel 1141 and/or backlight when the mobile phone is moved to the ear. The motion sensor may include an accelerometer sensor, which may detect the magnitude of an accelerated speed in each direction and may detect the size and direction of gravity while resting. The accelerometer sensor may be configured to identify an application of a mobile phone gesture (e.g., horizontal and vertical screen switching), and vibration identification relevant functions (e.g., pedometer and knocking). In addition, the mobile phone may also be configured with other sensors such as a gyroscope sensor, a barometer sensor, a hygrometer sensor, a thermometer sensor and an infrared sensor.

The audio circuit 1160, a loudspeaker 1161 and a microphone 1162 may provide an audio interface between the user and the mobile phone. The audio circuit 1160 may transmit an electric signal converted from the received audio data to the loudspeaker 1161, and the loudspeaker 1161 converts the electric signal into a sound signal for output. Moreover, the microphone 1162 converts a collected sound signal into an electric signal, the audio circuit 1160 converts the received electric signal into audio data and then outputs the audio data to the processor 1180 for processing, the processed audio data is transmitted to another mobile phone via the RF circuit 1110, or the audio data is output to the memory 1120 for further processing.

WiFi belongs to a short-range wireless transmission technology. The mobile phone may assist the user in E-mail receiving and sending, webpage browsing, access to streaming media and the like by means of the WiFi module 1170. The WiFi module provides a wireless wideband internet access for the user. Although FIG. 11 illustrates the WiFi module 1170, it may be understood that the WiFi module does not belong to necessary components of the mobile phone 1100 and can be omitted as required.

The processor 1180 is a control center of the mobile phone, and is configured to connect all parts of the whole mobile phone by utilizing various interfaces and lines, to run or execute the software program and/or the module stored in the memory 1120, and to call data stored in the memory 1120 to execute various functions and processing data of the mobile phone, so as to wholly monitor the mobile phone. In an embodiment, the processor 1180 may include one or more processing units. In an embodiment, the processor 1180 may be integrated with an application processor and a modem, here, the application processor mainly processes an operation system, a user interface, an application program and the like, and the modem mainly processes wireless communication. It may be understood that the modem may not be integrated into the processor 1180. For example, the processor 1180 may integrate an application processor and a baseband processor, and the baseband processor and other peripheral chips may constitute the modem. The mobile phone 1100 may further include a power supply 1190 (such as a battery) for supplying power to each component. Preferably, the power supply may be connected with the processor 1180 logically via a power supply management system, so as to implement functions of charging, discharging and power consumption management by means of the power supply management system.

In an embodiment, the mobile phone 1100 may further include a camera, a Bluetooth module and the like.

In the embodiments of the disclosure, the processor included by the mobile phone executes the computer program stored on the memory to implement the above-described method for processing the application.

Any reference used in the disclosure to a memory, storage, a database or other media may include non-volatile and/or volatile memories. The appropriate non-volatile memory may include a read only memory (ROM), a Programmable ROM (PROM), an Electrically Programmable ROM (EPROM), an Electrically Erasable Programmable ROM (EEPROM), or a flash memory. The volatile memory may include a RAM, used as an external cache memory. As being illustrative instead of being limitative, the RAM may be obtained in multiple forms such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiments only describe several implementation manners of the disclosure more specifically and in more detail, but cannot be thus understood as limitation to the patent scope of the disclosure. It should be noted that those of ordinary skill in the art may also make several variations and improvements without departing from the concept of the disclosure. These variations and improvements fall within the scope of protection of the disclosure.

Therefore, the scope of protection of the disclosure should be determined by the appended claims.

The invention claimed is:

1. A method for processing an application, the method being carried out in an electronic device and comprising:
   determining a plurality of reclaimable memory pages occupied by an application to be processed;
   writing data stored in the plurality of reclaimable memory pages into an external storage medium;
   pausing an operation of the application to be processed; and
   writing the data written into the external storage medium into a memory when the operation of the application to be processed is unpaused,
   wherein the method further comprises: before determining the plurality of reclaimable memory pages occupied by the application to be processed,
   detecting whether at least one foreground application is dependent on the application to be processed;
   when the at least one foreground application is dependent on the application to be processed, adjusting a priority of the application to be processed to match a priority of the at least one foreground application; and
   when the at least one foreground application is not dependent on the application to be processed, determining the plurality of reclaimable memory pages occupied by the application to be processed.

2. The method of claim 1, wherein writing the data stored in the plurality of reclaimable memory pages into the external storage medium comprises:
   writing the data stored in the plurality of reclaimable memory pages into the external storage medium in an asynchronous transmission manner,
   and wherein writing the data written into the external storage medium into the memory comprises:
   writing the data written into the external storage medium into the memory in a synchronous transmission manner.

3. The method of claim 1, wherein the pausing the operation of the application to be processed comprises:
   determining an increment of the memory occupied by the application to be processed; and
   when the increment is greater than a preset increase threshold, determining the plurality of reclaimable memory pages occupied by the application to be processed;
   writing the data stored in the plurality of reclaimable memory pages into the external storage medium; and
   pausing the operation of the application to be processed.

4. The method of claim 1, wherein determining the plurality of reclaimable memory pages occupied by the application to be processed comprises:
   traversing memory-mapped files of the application to be processed;
   querying, through the memory-mapped files, all memory pages occupied by the application to be processed; and
   determining remaining pages, except at least one particular memory page, of the all memory pages, as the plurality of reclaimable memory pages, wherein data stored on each of the at least one particular memory page is being used by the application to be processed or is data necessary for keeping normal running of the application to be processed.

5. The method of claim 4, wherein the determining remaining pages, except at least one particular memory page, of the all memory pages, as the plurality of reclaimable memory pages comprises:
   determining at least one particular memory page having stored data being used by the application to be processed or having data necessary for keeping normal running of the application to be processed;
   configuring an occupation mark for each of the at least one particular memory page, the occupation mark indicating that the particular memory page cannot be reclaimable; and
   determining the remaining pages, except the at least one particular memory page for which the occupation mark is configured, of the all memory pages, as the plurality of reclaimable memory pages.

6. The method of claim 1, wherein writing the data stored in the plurality of reclaimable memory pages into the external storage medium comprises:
   determining an idle duration of the application to be processed for each reclaimable memory page, the idle duration is a duration during which the reclaimable memory page is not used by the application to be processed;
   determining a duration threshold according to idle durations for the plurality of reclaimable memory pages; and
   selecting a reclaimable memory page for which the idle duration is greater than the duration threshold from the plurality of reclaimable memory pages, and writing data stored in the selected reclaimable memory page into the external storage medium.

7. The method of claim 6, wherein determining the idle duration of the application to be processed for each reclaimable memory page comprises:
   determining update time recorded by a timestamp of each reclaimable memory page, and calculating the idle duration corresponding to the reclaimable memory page according to the update time; or
   determining update time of each reclaimable memory page recorded by a Least Recently Used (LRU) management unit, and calculating the idle duration corresponding to the reclaimable memory page according to the update time;
   wherein the update time is a time at which the reclaimable memory page is used recently by the application to be processed.

8. The method of claim 6, wherein determining the duration threshold according to the idle duration for the plurality of reclaimable memory pages comprises:
   calculating an average idle duration of the application to be processed for the plurality of reclaimable memory pages according to the idle duration for each reclaimable memory page, and taking the average idle duration as the duration threshold; or
   determining a number of reclaiming for the plurality of reclaimable memory pages, selecting a $K^{th}$-largest idle duration from the idle durations for the plurality of reclaimable memory pages according to the number of the reclaiming, and taking the selected idle duration as the duration threshold, a number of reclaimable memory pages for which the idle durations are greater than the $K^{th}$-largest idle duration being the number of the reclaiming, and K being a natural number greater than the number of the reclaiming.

9. An electronic device, comprising a processor and a memory storing a computer program that when executed by the processor to enable the processor to:
- determine a plurality of reclaimable memory pages occupied by an application to be processed;
- write data stored in the plurality of reclaimable memory pages into an external storage medium;
- pause an operation of the application to be processed; and
- write the data written into the external storage medium into a memory when the operation of the application to be processed is unpaused;
- wherein the processor is configured to, before the plurality of reclaimable memory pages occupied by the application to be processed is are determined, detect whether at least one foreground application is dependent on the application to be processed;
- when the at least one foreground application is dependent on the application to be processed, adjust a priority of the application to be processed to match a priority of the at least one foreground application; and
- when the at least one foreground application is not dependent on the application to be processed, determine the plurality of reclaimable memory pages occupied by the application to be processed.

10. The electronic device of claim 9, wherein the processor is configured to:
- write the data stored in the plurality of reclaimable memory pages into the external storage medium in an asynchronous transmission manner; and
- write the data written into the external storage medium into the memory in a synchronous transmission manner.

11. The electronic device of claim 9, wherein the processor is further configured to:
- determine an increment of the memory occupied by the application to be processed; and
- when the increment is greater than a preset increase threshold, determine the plurality of reclaimable memory pages occupied by the application to be processed;
- write the data stored in the plurality of reclaimable memory pages into the external storage medium; and
- pause the operation of the application to be processed.

12. The electronic device of claim 9, wherein the processor is configured to:
- traverse memory-mapped files of the application to be processed;
- query, through the memory-mapped files, all memory pages occupied by the application to be processed; and
- determine remaining pages, except at least one particular memory page, of the all memory pages, as the plurality of reclaimable memory pages, wherein data stored on each of the at least one particular memory page is being used by the application to be processed or is data necessary for keeping normal running of the application to be processed.

13. The electronic device of claim 12, wherein the processor is configured to:
- determine at least one particular memory page having stored data being used by the application to be processed or having data necessary for keeping normal running of the application to be processed;
- configure an occupation mark for each of the at least one particular memory page, the occupation mark indicating that the particular memory page cannot be reclaimable; and
- determine the remaining pages, except the at least one particular memory page for which the occupation mark is configured, of the all memory pages, as the plurality of reclaimable memory pages.

14. The electronic device of claim 9, wherein the processor is configured to:
- determine an idle duration of the application to be processed for each reclaimable memory page, the idle duration is a duration during which the reclaimable memory page is not used by the application to be processed;
- determine a duration threshold according to idle durations for the plurality of reclaimable memory pages; and
- select a reclaimable memory page for which the idle duration is greater than the duration threshold from the plurality of reclaimable memory pages, and write data stored in the selected reclaimable memory page into the external storage medium.

15. The electronic device of claim 9, wherein the processor is configured to:
- determine update time recorded by a timestamp of each reclaimable memory page, and calculate the idle duration corresponding to the reclaimable memory page according to the update time; or
- determine update time of each reclaimable memory page recorded by a Least Recently Used (LRU) management unit, and calculate the idle duration corresponding to the reclaimable memory page according to the update time;
- wherein the update time is a time at which the reclaimable memory page is used recently by the application to be processed.

16. The electronic device of claim 14, wherein the processor is configured to:
- calculate an average idle duration of the application to be processed for the plurality of reclaimable memory pages according to the idle duration for each reclaimable memory page, and take the average idle duration as the duration threshold; or
- determine a number of reclaiming for the plurality of reclaimable memory pages, select a $K^{th}$-largest idle duration from the idle durations for the plurality of reclaimable memory pages according to the number of the reclaiming, and take the selected idle duration as the duration threshold, wherein a number of reclaimable memory pages for which the idle durations are greater than the $K^{th}$-largest idle duration is the number of the reclaiming, and K is a natural number greater than the number of the reclaiming.

17. A non-transitory computer-readable storage medium having stored thereon a computer program that when executed by a processor to implement a method for processing an application, the method comprising:
- determining a plurality of reclaimable memory pages occupied by an application to be processed;
- writing data stored in the plurality of reclaimable memory pages into an external storage medium;
- pausing an operation of the application to be processed; and
- writing the data written into the external storage medium into a memory when the operation of the application to be processed is unpaused;
- wherein the method further comprises: before determining the plurality of reclaimable memory pages occupied by the application to be processed,
- detecting whether at least one foreground application is dependent on the application to be processed;

when the at least one foreground application is dependent on the application to be processed, adjusting a priority of the application to be processed to match a priority of the at least one foreground application; and when the at least one foreground application is not dependent on the application to be processed, determining the plurality of reclaimable memory pages occupied by the application to be processed.

18. The non-transitory computer-readable storage medium of claim 17, wherein writing the data stored in the plurality of reclaimable memory pages into the external storage medium comprises:

writing the data stored in the plurality of reclaimable memory pages into the external storage medium in an asynchronous transmission manner, and wherein writing the data written into the external storage medium into the memory comprises:

writing the data written into the external storage medium into the memory in a synchronous transmission manner.

* * * * *

UNITED STATES PATENT AND TRADEMARK OFFICE
CERTIFICATE OF CORRECTION

Page 1 of 1

PATENT NO. : 11,144,477 B2
APPLICATION NO. : 16/168236
DATED : October 12, 2021
INVENTOR(S) : Pan Fang et al.

It is certified that error appears in the above-identified patent and that said Letters Patent is hereby corrected as shown below:

On the Title Page

(71) Applicant:
"GUANGOONG OPPO MOBILE TELECOMMUNICATIONS CORP., LTD., Guangdong (CN)"
Should read as:
--GUANGDONG OPPO MOBILE TELECOMMUNICATIONS CORP., LTD., Dongguan, Guangdong (CN)--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*